United States Patent
Zhang et al.

(10) Patent No.: US 12,363,220 B2
(45) Date of Patent: *Jul. 15, 2025

(54) AUDIO OUTPUT METHOD AND TERMINAL DEVICE

(71) Applicant: Honor Device Co., Ltd., Shenzhen (CN)

(72) Inventors: Lirong Zhang, Shenzhen (CN); Chao Le, Shenzhen (CN); Bo Ling, Shenzhen (CN); Li Li, Shenzhen (CN); Zhongyin Jiang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/617,136

(22) Filed: Mar. 26, 2024

(65) Prior Publication Data

US 2024/0236228 A1 Jul. 11, 2024

Related U.S. Application Data

(63) Continuation of application No. 17/794,135, filed as application No. PCT/CN2020/122956 on Oct. 22, 2020, now Pat. No. 11,979,516.

(30) Foreign Application Priority Data

Jan. 22, 2020 (CN) .......................... 202010075562.8

(51) Int. Cl.
*H04M 1/72484* (2021.01)
*G06F 3/16* (2006.01)
(Continued)

(52) U.S. Cl.
CPC ........ *H04M 1/72484* (2021.01); *G06F 3/165* (2013.01); *G10L 15/22* (2013.01); *H04M 1/72442* (2021.01); *G10L 2015/223* (2013.01)

(58) Field of Classification Search
CPC .......... H04M 1/72484; H04M 1/72442; G06F 3/165
See application file for complete search history.

(56) References Cited

U.S. PATENT DOCUMENTS 8,265,557 B2 9/2012 Chung
8,295,766 B2 10/2012 Zimbric et al.
(Continued)

FOREIGN PATENT DOCUMENTS

CN 101785198 A 7/2010
CN 103220404 A 7/2013
(Continued)

*Primary Examiner* — Amal S Zenati
(74) *Attorney, Agent, or Firm* — Conley Rose, P.C.

(57) ABSTRACT

An audio output method and system including first and second electronic devices and an audio output device. The first and second devices are connected to a network using a system authentication account, the first device has installed thereon a music application, and the second device has installed thereon a voice call application. When the audio output device outputs an audio signal corresponding to audio data of the music application, in response to the second device receiving an incoming call from the voice call application, the first device displays a prompt corresponding to the incoming call. The first device sends an indication of answering the incoming call to the second device, which answers the incoming call and sends audio data of the incoming call to the first device, and the first device causes the audio output device to output an audio signal corresponding to the audio data of the incoming call.

20 Claims, 13 Drawing Sheets

(51) Int. Cl.
*G10L 15/22* (2006.01)
*H04M 1/72442* (2021.01)

(56) References Cited

U.S. PATENT DOCUMENTS

| | | | |
|---|---|---|---|
| 9,648,153 | B2 | 5/2017 | Wen et al. |
| 9,774,979 | B1 * | 9/2017 | Morishita ............... H04S 7/304 |
| 9,924,010 | B2 * | 3/2018 | Watson ............... H04M 1/6066 |
| 10,070,215 | B2 | 9/2018 | Schobel et al. |
| 10,178,234 | B2 | 1/2019 | Coffman et al. |
| 10,554,800 | B2 | 2/2020 | Watson et al. |
| 11,412,488 | B2 | 8/2022 | Li et al. |
| 2005/0027385 | A1 | 2/2005 | Yueh |
| 2013/0157631 | A1 | 6/2013 | Wang et al. |
| 2013/0232282 | A1 | 9/2013 | Kim |
| 2015/0045092 | A1 | 2/2015 | Wang et al. |
| 2015/0350766 | A1 | 12/2015 | Schobel et al. |
| 2016/0269522 | A1 | 9/2016 | Wen et al. |
| 2017/0006415 | A1 | 1/2017 | Song |
| 2018/0205813 | A1 | 7/2018 | Watson et al. |
| 2018/0376238 | A1 * | 12/2018 | Schobel ............... H04W 76/10 |
| 2019/0179602 | A1 | 6/2019 | Morganstern et al. |
| 2021/0400388 | A1 | 12/2021 | Kumar et al. |
| 2022/0004315 | A1 | 1/2022 | Zhang et al. |
| 2022/0201113 | A1 | 6/2022 | Peng |
| 2022/0294891 | A1 | 9/2022 | Liu |
| 2023/0362296 | A1 | 11/2023 | Li et al. |

FOREIGN PATENT DOCUMENTS

| | | |
|---|---|---|
| CN | 103780751 B | 7/2015 |
| CN | 104954853 A | 9/2015 |
| CN | 105045555 A | 11/2015 |
| CN | 105228118 A | 1/2016 |
| CN | 105791064 A | 7/2016 |
| CN | 106416207 A | 2/2017 |
| CN | 106416210 A | 2/2017 |
| CN | 106445448 A | 2/2017 |
| CN | 103220404 B | 5/2017 |
| CN | 107995369 A | 5/2018 |
| CN | 108064445 A | 5/2018 |
| CN | 109392103 A | 2/2019 |
| CN | 109660842 A | 4/2019 |
| CN | 110138937 A | 8/2019 |
| CN | 110191241 A | 8/2019 |
| CN | 110191442 A | 8/2019 |
| CN | 106254185 B | 12/2019 |
| CN | 110602312 A | 12/2019 |
| CN | 111464689 A | 7/2020 |
| CN | 112822663 A | 5/2021 |
| CN | 112887926 A | 6/2021 |
| CN | 113382397 A | 9/2021 |
| CN | 113905358 A | 1/2022 |
| EP | 2309708 A2 | 4/2011 |
| EP | 3135024 B1 | 3/2018 |
| JP | 2003125478 A | 4/2003 |
| JP | 2004072498 A | 3/2004 |
| JP | 2006186904 A | 7/2006 |
| JP | 2007259276 A | 10/2007 |
| JP | 2019200741 A | 11/2019 |
| RU | 2482606 C2 | 5/2013 |
| RU | 2638938 C2 | 12/2017 |
| WO | 2020249062 A1 | 12/2020 |

* cited by examiner

AUDIO OUTPUT METHOD AND TERMINAL DEVICE

CROSS-REFERENCE TO RELATED APPLICATIONS

This application is a continuation application of U.S. patent application Ser. No. 17/794,135 filed on Jul. 20, 2022, which is a national stage of International Application No. PCT/CN2020/122956, filed on Oct. 22, 2020, which claims priority to Chinese patent application Ser. No. 20/2010075562.8, filed with the China National Intellectual Property Administration on Jan. 22, 2020, all of which are incorporated herein by reference in their entireties.

TECHNICAL FIELD

This application relates to the field of terminal technologies, and in particular, to an audio output method and a terminal device.

BACKGROUND

With the development of intelligent terminals, it is becoming increasingly popular for a user to own a plurality of terminal devices, for example, a user may have three terminal devices of a smart phone, a tablet computer, and a notebook computer at the same time. Currently, a terminal device may also be connected to another audio output device such as a wired earphone, a Bluetooth earphone, or an external speaker in addition to a self-contained earpiece.

At present, in a public environment such as office, when a user uses an earphone to connect a notebook computer to listen to music, and if a mobile phone of the user has an incoming call, the user may miss the call due to not hearing an incoming call ringtone. Even if the user hears the ringtone, if the user wants to use the earphone to answer the call, and if the user uses the wired earphone, the user needs to pull out the wired earphone from the notebook computer and then insert into an earphone jack of the mobile phone, so that the incoming call of the mobile phone can be answered through the wired earphone. If the user uses a Bluetooth earphone, the user needs to interrupt a connection between the notebook computer and the Bluetooth earphone, and connect the mobile phone to the Bluetooth earphone, so that the incoming call of the mobile phone can be answered through the Bluetooth earphone. It can be seen that the process is relatively cumbersome, affecting the user experience.

SUMMARY

This application provides an audio output method and a terminal device, helping to reduce the operation complexity of a user, improve a degree of intelligence of the terminal device, and finally improve the user experience.

According to a first aspect, an embodiment of this application provides an audio output method. The method is applicable to at least two terminal devices of a same user. The at least two terminal devices of the user are connected to a network by using a same system authentication account. Specifically, The method includes that: a first terminal device receives an audio output request from a second terminal device, a user sends an operation instruction in response to the audio output request, and the first terminal device receives an operation of the user and then sends an audio output request response to the second terminal device in response to the operation, where the audio output request response is used for triggering the second terminal device to obtain audio data corresponding to the audio output request, for example, triggering the second terminal device to answer an incoming call to obtain call data. the first terminal device receives the audio data from the second terminal device and then outputs the audio data to the audio output device, so that the audio output device outputs a first audio signal corresponding to the audio data, where the audio output device may be a wired audio output device, and the wired audio output device is in a state of being connected to the first terminal device.

It can be learned that in the foregoing embodiment, the second terminal device is not connected to the audio output device but may output an audio signal by using the audio output device connected to the first terminal device. The user may switch to output audio signals from different devices on the wired audio output device without requiring to hold the second terminal device nor insert or eject the wired audio output device, for example, switch to output call data on the wired audio output device, to achieve the better user experience.

In a possible implementation, after receiving the audio output request from the second terminal device, the first terminal device may first convert the audio output request into a second audio signal, where the second audio signal is used for prompting the user that there is the audio output request from the second terminal device by using a voice, and then control the audio output device to output the second audio signal while outputting a third audio signal of the first terminal device. In this implementation, if the first terminal device is a device such as an intelligent television, and when the user cannot respond by operating the first terminal device, the user may execute the method, so that the user responds to the audio output request by operating the audio output device.

In another possible implementation, after receiving the audio output request from the second terminal device, the first terminal device may display prompt information, where the prompt information is used for prompting the user that there is the audio output request from the second terminal device. For example, in this case, if the first terminal device is a tablet computer, a notebook computer, or the like, the user may answer a call or hang up a call by operating the first terminal device.

In a possible implementation, before the method embodiments are performed, the first terminal device and the second terminal device may be connected to an access point device, to establish an internal local area network connection, that is, the first terminal device and the second terminal device are located in a same local area network, or the first terminal device, the second terminal device, and a third terminal device may be connected to a same access point, to establish an internal local area network connection. For example, both the first terminal device and the second terminal device are connected to a same Wi-Fi hotspot. Because the terminal devices are connected by a local area network, call data can be transmitted across devices without consuming cellular network traffic.

In a possible implementation, before the first terminal device establishes a network connection to the second terminal device, the first terminal device sends a broadcast message, where the broadcast message includes a ciphertext, and the ciphertext is obtained by the first terminal device encrypting a system authentication account of the first terminal device by using a public key corresponding to the system authentication account of the first terminal device.

After receiving the broadcast message, the second terminal device decrypts the ciphertext by using a private key corresponding to a system authentication account of the second terminal device and then sends a feedback message indicating whether decryption succeeds to the first terminal device. When receiving the feedback message indicating that the ciphertext is decrypted successfully, the first terminal device may determine that the system authentication account of the second terminal device is the same as the system authentication account of the first terminal device. When receiving the feedback message indicating that the ciphertext fails to be decrypted, the first terminal device may determine that the system authentication account of the second terminal device is different from the system authentication account of the first terminal device. The reason for this is to ensure the security of data access between devices and prevent the data in the devices from being illegally accessed. For example, the system authentication account may be a Huawei ID, an Apple ID, or the like of a user.

According to a second aspect, an embodiment of this application provides an audio output method, applicable to at least two terminal devices of a same user, where the at least two terminal devices of the user are connected to a network by using a same system authentication account. Specifically, the method includes that: a first terminal device receives an audio output request from a second terminal device, a user sends an operation instruction in response to the audio output request, and then the first terminal device sends an audio output request response to the second terminal device in response to the operation, where the audio output request response is used for triggering the second terminal device to obtain audio data corresponding to the audio output request. After the first terminal device sends the audio output request response or when the first terminal device sends the audio output request response, the first terminal device disconnects a connection with an audio output device, the audio output device establishes a connection with the second terminal device, and then the second terminal device outputs the audio data to the audio output device, so that the audio output device outputs a first audio signal corresponding to the audio data, where the audio output device may be a wireless audio output device.

In this embodiment of this application, the user can switch to output audio signals from different devices on the wireless audio output device without requiring to operate the second terminal device nor manually disconnect and reconnect the wireless audio output device. For example, when a mobile phone is not around the user, output of call data may be switched on the wireless audio output device according to the method, and it is not easy to miss a call, to achieve the better user experience.

In a possible implementation, after receiving the audio output request from the second terminal device, the first terminal device may first convert the audio output request into a second audio signal, where the second audio signal is used for prompting the user that there is the audio output request from the second terminal device by using a voice, and then control the audio output device to output the second audio signal while outputting a third audio signal of the first terminal device. In this implementation, if the first terminal device is a device such as an intelligent television, and when the user cannot respond by operating the first terminal device, the user may execute the method, so that the user responds to the audio output request by operating the audio output device.

In another possible implementation, after receiving the audio output request from the second terminal device, the first terminal device may display prompt information, where the prompt information is used for prompting the user that there is the audio output request from the second terminal device. For example, in this case, if the first terminal device is a tablet computer, a notebook computer, or the like, the user may answer a call or hang up a call by operating the first terminal device.

In a possible implementation, before the method embodiments are performed, the first terminal device and the second terminal device may be connected to a same access point device, to establish an internal local area network connection, that is, the first terminal device and the second terminal device are located in a same local area network, or the first terminal device, the second terminal device, and a third terminal device may be connected to a same access point, to establish an internal local area network connection. For example, both the first terminal device and the second terminal device are connected to a same Wi-Fi hotspot. Because the terminal devices are connected by a local area network, call data can be transmitted across devices without consuming cellular network traffic.

In a possible implementation, before the first terminal device establishes a network connection to the second terminal device, the first terminal device sends a broadcast message, where the broadcast message includes a ciphertext, and the ciphertext is obtained by the first terminal device encrypting a system authentication account of the first terminal device by using a public key corresponding to the system authentication account of the first terminal device. After receiving the broadcast message, the second terminal device decrypts the ciphertext by using a private key corresponding to a system authentication account of the second terminal device and then sends a feedback message indicating whether decryption succeeds to the first terminal device. When receiving the feedback message indicating that the ciphertext is decrypted successfully, the first terminal device may determine that the system authentication account of the second terminal device is the same as the system authentication account of the first terminal device. When receiving the feedback message indicating that the ciphertext fails to be decrypted, the first terminal device may determine that the system authentication account of the second terminal device is different from the system authentication account of the first terminal device. The reason for this is to ensure the security of data access between devices and prevent the data in the devices from being illegally accessed. For example, the system authentication account may be a Huawei ID, an Apple ID, or the like of a user.

According to a third aspect, an embodiment of this application provides an audio output method, applicable to at least two terminal devices of a same user, where the at least two terminal devices of the user are connected to a network by using a same system authentication account. Specifically, the method includes that: a second terminal device receives an audio output request, the second terminal device sends the audio output request to a first terminal device in response to the audio output request, and then the second terminal device receives an audio output request response from the first terminal device, where the audio output request response is used for triggering the second terminal device to obtain audio data corresponding to the audio output request. After the second terminal device receives the audio output request response, an audio output device establishes a connection with the second terminal device, and then the second terminal device outputs a first audio signal corresponding to the audio data by using the audio output device, where the audio output device may be a wireless audio output device.

In this embodiment of this application, the user can switch to output audio signals from different devices on the wireless audio output device without requiring to operate the second terminal device nor manually disconnect and reconnect the wireless audio output device. For example, when a mobile phone is not around the user, output of call data may be switched on the wireless audio output device according to the method, and it is not easy to miss a call, to achieve the better user experience.

In a possible implementation, before the method embodiments are performed, the first terminal device and the second terminal device may be connected to a same access point device, to establish an internal local area network connection, that is, the first terminal device and the second terminal device are located in a same local area network, or the first terminal device, the second terminal device, and a third terminal device may be connected to a same access point, to establish an internal local area network connection. For example, both the first terminal device and the second terminal device are connected to a same Wi-Fi hotspot. Because the terminal devices are connected by a local area network, call data can be transmitted across devices without consuming cellular network traffic.

In a possible implementation, before the first terminal device establishes a network connection to the second terminal device, the first terminal device sends a broadcast message, where the broadcast message includes a ciphertext, and the ciphertext is obtained by the first terminal device encrypting a system authentication account of the first terminal device by using a public key corresponding to the system authentication account of the first terminal device. After receiving the broadcast message, the second terminal device decrypts the ciphertext by using a private key corresponding to a system authentication account of the second terminal device and then sends a feedback message indicating whether decryption succeeds to the first terminal device. When receiving the feedback message indicating that the ciphertext is decrypted successfully, the first terminal device may determine that the system authentication account of the second terminal device is the same as the system authentication account of the first terminal device. When receiving the feedback message indicating that the ciphertext fails to be decrypted, the first terminal device may determine that the system authentication account of the second terminal device is different from the system authentication account of the first terminal device. The reason for this is to ensure the security of data access between devices and prevent the data in the devices from being illegally accessed. For example, the system authentication account may be a Huawei ID, an Apple ID, or the like of a user.

According to a fourth aspect, an embodiment of this application provides an audio output method. The method includes that: a second terminal device receives an audio output request, and then the second terminal device sends the audio output request to a first terminal device, where the second terminal device and the first terminal device are connected to a network by using a same system authentication account, and the first terminal device is currently connected to the audio output device.

The first terminal device receives the audio output request, and the first terminal device receives an operation of a user in response to the audio output request.

The first terminal device sends an audio output request response to the second terminal device in response to the operation. The second terminal device obtains audio data corresponding to the audio output request in response to the audio output request response. The second terminal device sends the audio data to the first terminal device. Finally, the first terminal device outputs a first audio signal corresponding to the audio data by using the audio output device.

For the beneficial effects of this application, reference may be made to the beneficial effects of the first aspect, and details are not described herein again.

According to a fifth aspect, an embodiment of this application provides an audio output method. The method includes that: a second terminal device receives an audio output request, and the second terminal device sends the audio output request to a first terminal device, where the second terminal device and the first terminal device are connected to a network by using a same system authentication account, and the first terminal device is currently connected to an audio output device, the first terminal device receives the audio output request, and the first terminal device receives an operation of a user in response to the audio output request. The first terminal device sends an audio output request response to the second terminal device in response to the operation and disconnects a first communication link with the audio output device. The second terminal device obtains audio data corresponding to the audio output request in response to the audio output request response. The second terminal device establishes a second communication link with the audio output device and outputs a first audio signal corresponding to the audio data by using the audio output device.

For the beneficial effects of this application, reference may be made to the beneficial effects of the second aspect, and details are not described herein again.

According to a sixth aspect, an embodiment of this application provides a first terminal device, including a sensor, a touch screen, a processor, and a memory, where the memory is configured to store one or more computer programs; and the one or more computer programs stored in the memory, when being executed by the processor, cause the terminal device to implement the method according to any possible design of the first aspect, or the method according to any possible design of the second aspect, or the method according to any possible design of the fourth aspect, or the method according to any possible design of the fifth aspect.

According to a seventh aspect, an embodiment of this application provides a second terminal device, including a sensor, a touch screen, a processor, and a memory, where the memory is configured to store one or more computer programs; and the one or more computer programs stored in the memory, when being executed by the processor, cause the terminal device to implement the method according to any possible design of the third aspect, or the method according to any possible design of the fourth aspect, or the method according to any possible design of the fifth aspect.

According to an seventh aspect, an embodiment of this application provides an audio output system, including the first terminal device and the second terminal device and configured to perform the method according to any possible design of the fourth aspect or the method according to any possible design of the fifth aspect.

According to a eighth aspect, an embodiment of this application further provides an apparatus, including modules/units performing the method according to any possible design of any one of the aspects. The modules/units may be implemented by using hardware or may be implemented by hardware executing corresponding software.

According to a ninth aspect, an embodiment of this application further provides a computer-readable storage medium, including a computer program, the computer program, when running on a terminal device, causing the terminal device to perform the method according to any possible design of any one of the aspects.

According to an tenth aspect, an embodiment of this application further provides a computer program product, the computer program product, when running on a terminal, causing the terminal device to perform the method according to any possible design of any one of the aspects.

According to a eleventh aspect, an embodiment of this application further provides a chip, coupled to a memory and configured to execute a computer program stored in the memory to perform the method according to any possible design of any one of the aspects.

DESCRIPTION OF EMBODIMENTS

To make objectives, technical solutions, and advantages of the embodiments of this application clearer, the following describes the technical solutions in the embodiments of this application in detail with reference to the accompanying drawings and specific implementations of the specification.

Some wordings in the embodiments of this application are first explained below for easy understanding of a person skilled in the art.

(1) An application in the embodiments of this application, referred to as an APP for short, is a software program that can implement one or more specific functions. Generally, a plurality of applications may be installed on a terminal device, for example, a camera application, an email application, and a smart home control application. The application mentioned below may be a system application installed at delivery of a terminal device, or may be a third-party application downloaded from a network or obtained from other terminal devices when a user uses a terminal device.

(2) An audio output device may be classified as two types of a wireless audio device and a wired audio device. The wireless audio device is, for example, a Bluetooth earphone, and the wired audio device is, for example, a wired earphone. The audio output device is connected to a terminal device by a wired connection or a wireless network connection, to convert audio data of the terminal device into voice content and output the voice content. For example, the audio data may be a voice call or a voice call or a video call established by using an application (for example, WeChat or Facebook), audio data when a music player plays a music service, or audio data when a video player plays a video service.

Figure 1:
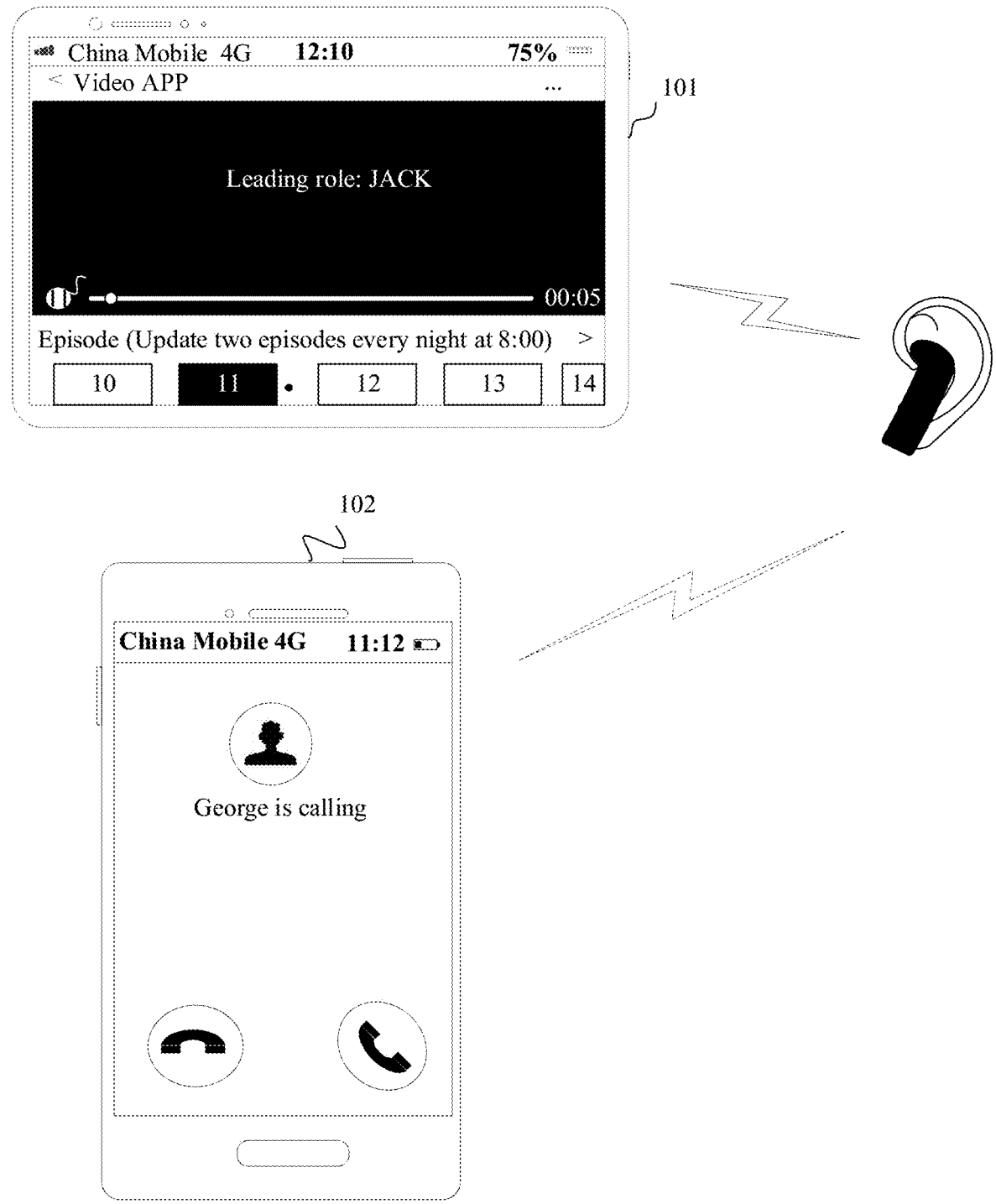
FIG. 1 is a schematic diagram of an application scenario according to an embodiment of this application.

In the prior art, a user can switch an audio signal outputted by the audio output device only by manually switching the terminal device connected to the audio output device. For example, as shown in FIG. 1, a tablet computer 101 currently plays a video, and the tablet computer 101 plays audio content of the video by using an earphone 100. In this case, if a mobile phone 102 of a user has an incoming call and the user wants to answer the call by using a Bluetooth earphone, the user needs to interrupt a connection between the earphone 100 and the tablet computer 101. If the earphone 100 is the Bluetooth earphone, the user needs to establish a Bluetooth connection between the Bluetooth earphone 100 and the mobile phone 102 to successfully answer the call. If the earphone 100 is a wired earphone, the user needs to manually unplug the earphone 100 from the tablet computer 101 and insert the earphone into an earphone jack of the mobile phone 102. It can be seen that the above operation process is relatively cumbersome, affecting the user experience.

In view of this, an embodiment of this application provides an audio output method. By using the method, an audio signal outputted by an audio output device can be automatically switched, so that a terminal device can automatically switch the audio output device to answer a call from a second terminal device when outputting a first audio signal by using the audio output device. Therefore, the operation complexity of the user is reduced, a degree of intelligence of the terminal device is improved, and finally the user experience is improved.

The embodiments of this application are applicable to a terminal device. In some embodiments, the terminal device may be a portable terminal including functions such as a personal digital assistant and/or a music player, for example, a mobile phone, a tablet computer, a wearable device (for example, a smartwatch) having a wireless communication function, or an in-vehicle device. An example of an embodiment of the portable terminal includes but is not limited to a portable terminal carrying an iOS®, an Android®, a Microsoft®, or another operating system. The portable terminal may alternatively be, for example, a laptop computer (Laptop) having a touch-sensitive surface (for example, a touch panel). It should be further understood that in some other embodiments, the terminal may alternatively be a desktop computer having a touch-sensitive surface (for example, a touch panel).

It should be understood that in the embodiments of this application, "at least one" refers to one or more, and "a plurality of" refers to two or more. "And/or" describes an association relationship for associated objects and represents that three relationships may exist. For example, A and/or B may represent: only A exists, both A and B exist, and only B exists, where A and B may be singular or plural. The character "/" generally indicates an "or" relationship between the associated objects. "At least one of the following items" or a similar expression means any combination of these items, including a single item or any combination of a plurality of items. For example, at least one of a, b, or c may represent a, b, c, a and b, a and c, b and c, or a, b, and c, where a, b, and c may be singular or plural.

Figure 2:
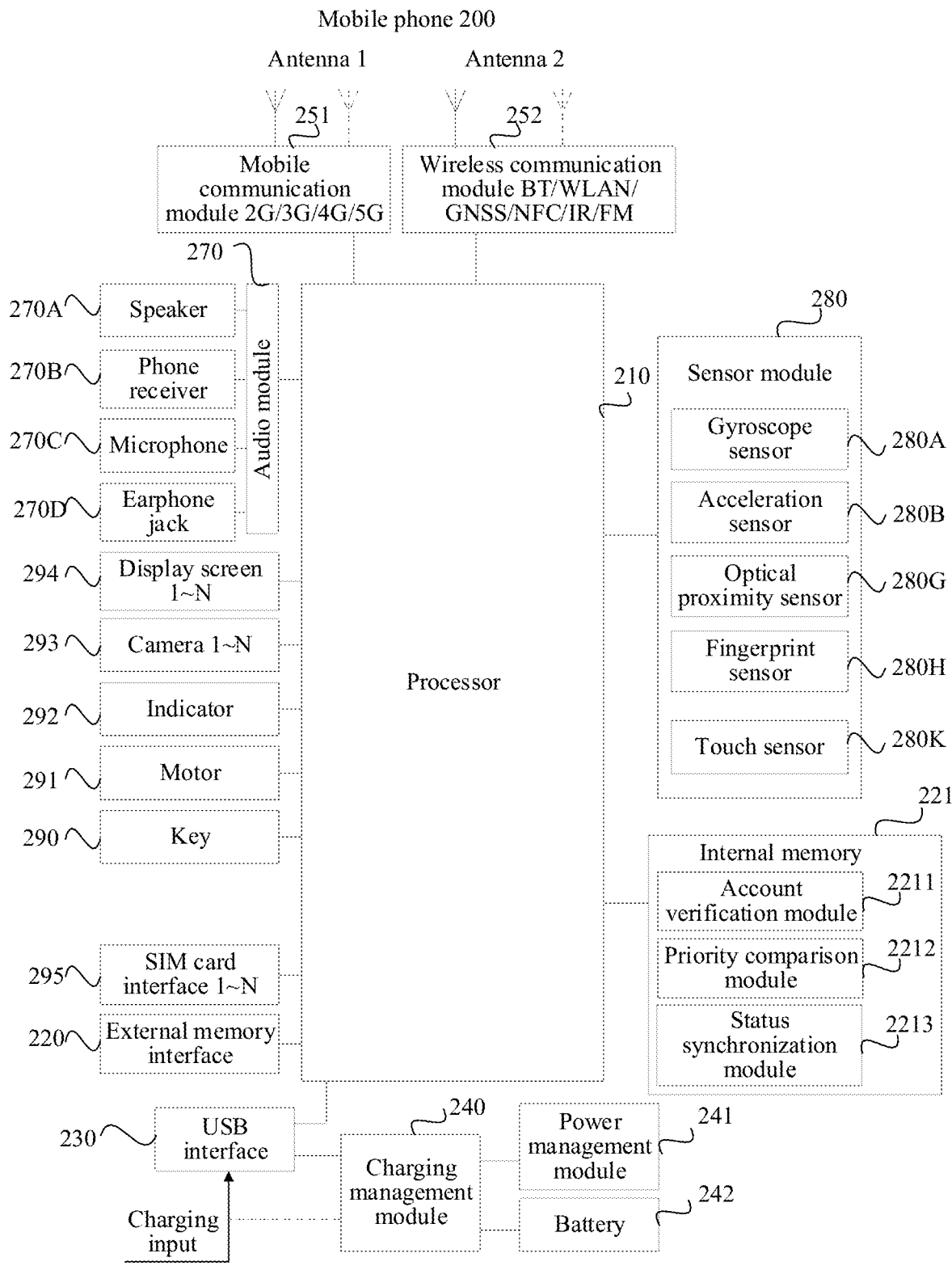
FIG. 2 is a schematic structural diagram of a mobile phone according to an embodiment of this application.

An example in which the terminal device is a mobile phone is used below. FIG. 2 is a schematic structural diagram of a mobile phone 200.

The mobile phone 200 may include a processor 210, an external memory interface 220, an internal memory 221, a USB interface 230, a charging management module 240, a power management module 241, a battery 242, an antenna 1, an antenna 2, a mobile communication module 251, a wireless communication module 252, an audio module 270, a speaker 270A, a phone receiver 270B, a microphone 270C, an earphone jack 270D, a sensor module 280, a key 290, a motor 291, an indicator 292, a camera 293, a display screen 294, an SIM card interface 295, and the like. The sensor module 280 may include a gyro sensor 280A, an acceleration sensor 280B, an optical proximity sensor 280G, a fingerprint sensor 280H, and a touch screen 280K (certainly, the mobile phone 200 may further include other sensors, for example, a temperature sensor, a pressure sensor, a distance sensor, a magnetic sensor, an ambient light sensor, a barometric pressure sensor, and a bone conduction sensor, but are not shown in the figure).

It may be understood that an example structure in this embodiment of the present disclosure does not constitute a specific limitation on the mobile phone 200. In some other embodiments of this application, the mobile phone 200 may include more or fewer components than those shown in the figure, or some components may be combined, or some components may be split, or components are arranged in different manners. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors. The controller may be a nerve center and a command center of the mobile phone 200. The controller may generate an operation control signal based on an instruction operation code and a timing signal, and read an instruction and control execution of the instruction.

A memory may be further configured in the processor 210, to store an instruction and data. In some embodiments, the memory in the processor 210 is a cache. The memory may store an instruction or data that has just been used or cyclically used by the processor 210. If the processor 210 needs to use the instruction or the data again, the processor may directly invoke the instruction or the data from the memory, to avoid repeated access and reduce a waiting time of the processor 210, thereby improving system efficiency.

The processor 210 may run the audio output method provided in this embodiment of this application, to reduce the operation complexity of the user, improve a degree of intelligence of the terminal device, and improve the user experience. The processor 210 may include different components. For example, when the CPU and the GPU are integrated, the CPU and the GPU may perform the audio output method provided in this embodiment of this application through cooperation. For example, a part of algorithm in the audio output method is performed by the CPU, and the other part of algorithm in the audio output method is performed by the GPU, to achieve the relatively high processing efficiency.

The display screen 294 is configured to display an image, a video, and the like. The display screen 294 includes a display panel. The display panel may use a liquid crystal touchscreen (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), and the like. In some embodiments, the mobile phone 200 may include one or N display screens 294. N is a positive integer greater than 1. The display screen 294 may be configured to display information entered by the user or information provided to the user, and graphical user interfaces (graphical user interface, GUI). For example, the display screen 294 may display a picture, a video, a page, a file, or the like. In another example, the display screen 294 may display a graphical user interface shown in FIG. 1. In still another example, the graphical user interface shown in FIG. 1 includes a status bar, a hideable navigation bar, a time and weather widget (widget), and an application icon such as a browser icon. The status bar includes an operator name (for example, China Mobile), a mobile network (for example, 4G), a time, and a remaining battery level. The navigation bar includes a back (back) key icon, a home (home) key icon, and a forward key icon. In addition, it may be understood that in some embodiments, the status bar may further include a Bluetooth icon, a Wi-Fi icon, an external device icon, and the like. It may be further understood that in some other embodiments, the graphical user interface shown in FIG. 1 may further include a dock bar, where the dock bar may include common application icons and the like. When detecting a touch event of a finger (or a stylus or the like) of a user for an application icon, the processor 210 opens a user interface of an application corresponding to the application icon in response to the touch event and displays the user interface of the application on the display screen 294.

In this embodiment of this application, the display screen 294 may be an integrated flexible display screen or may be a spliced display screen formed by two rigid screens and a flexible screen located between the two rigid screens. When the processor 210 runs the audio output method provided in this embodiment of this application, the processor 210 may control an external audio output device to switch an outputted audio signal.

The camera 293 (a front-facing camera or a rear-facing camera, or a camera may be used as a front-facing camera and a rear-facing camera) is configured to capture a static image or a video. Generally, the camera 293 may include a photosensitive element such as a lens group and an image sensor. The lens group includes a plurality of lenses (convex lenses or concave lenses) and is configured to acquire an optical signal reflected by a to-be-photographed object and transmit the acquired optical signal to the image sensor. The image sensor generates an original image of the to-be-photographed object according to the optical signal.

The internal memory 221 may be configured to store computer executable program code, and the executable program code includes an instruction. The processor 210 runs the instruction stored in the internal memory 221, to perform various function applications and data processing of the mobile phone 200. The internal memory 221 may include a program storage area and a data storage area. The program storage area may store an operating system, code of an application (for example, a camera application or a WeChat application), and the like. The data storage area may store data (for example, an image and a video acquired by the camera application) created during use of the mobile phone 200 and the like.

The internal memory 221 may further store one or more computer programs 1310 corresponding to the audio output algorithm provided in this embodiment of this application. The one or more computer programs 1304 are stored in the memory 221 and are configured to be executed by the one or more processors 210. The one or more computer programs 1310 include instructions. The instructions may be configured to perform steps in corresponding embodiments in FIG. 7A, and FIG. 8 to FIG. 11. The computer programs 1310 may include an account verification module 2211 and a priority comparison module 2212. The account verification module 2211 is configured to verify a system authentication account of another terminal device in a local area network. The priority comparison module 2212 may be configured to compare a priority of an audio output request service with a priority of a current output service of an audio output device. A status synchronization module 2213 may be configured to synchronize a device status of an audio output device currently connected to the terminal device to another terminal device, or synchronize a device status of an audio output device currently connected to another device to a local. When code of an audio output algorithm stored in the internal memory 221 is run by the processor 210, the processor 210 may control the audio output device to switch an outputted audio signal.

In addition, the internal memory 221 may include a high-speed random access memory, or may include a non-volatile memory such as at least one magnetic disk memory, a flash memory, or a universal flash storage (universal flash storage, UFS).

Certainly, the code of the audio output algorithm provided in this embodiment may alternatively be stored in an external memory. In this case, the processor 210 may run code of the audio output algorithm stored in the external memory by using the external memory interface 220, and the processor 210 may control the audio output device to switch the outputted audio signal.

A function of the sensor module 280 is described below.

The gyro sensor 280A may be configured to determine a motion posture of the mobile phone 200. In some embodiments, an angular velocity of the mobile phone 200 around three axes (that is, x, y, and z axes) may be determined by using the gyroscope sensor 280A. That is, the gyro sensor 280A may be configured to detect a current motion status of the mobile phone 200, for example, shaking or static.

When the display screen in this embodiment of this application is a foldable screen, the gyro sensor 280A may be configured to detect a folding or unfolding operation on the display screen 294. The gyro sensor 280A may report the detected folding operation or unfolding operation as an event to the processor 210 to determine a folded state or an unfolded state of the display screen 294.

The acceleration sensor 280B may detect an acceleration value of the mobile phone 200 in each direction (generally three axes). That is, the gyro sensor 280A may be configured to detect a current motion status of the mobile phone 200, for example, shaking or static. When the display screen in this embodiment of this application is a foldable screen, the acceleration sensor 280B may be configured to detect a folding or unfolding operation on the display screen 294. The acceleration sensor 280B may report the detected folding operation or unfolding operation as an event to the processor 210 to determine a folded state or an unfolded state of the display screen 294.

The optical proximity sensor 280G may include, for example, a light-emitting diode (LED) and an optical detector such as a photodiode. The light emitting diode may be an infrared light emitting diode. The mobile phone may emit infrared light by using the light-emitting diode. The mobile phone detects infrared reflected light from a nearby object by using the photodiode. When detecting sufficient reflected light, it may be determined that there is an object near the mobile phone. When detecting insufficient reflected light, the mobile phone may determine that there is no object near the mobile phone. When the display screen in this embodiment of this application is a foldable screen, the optical proximity sensor 280G may be disposed on a first screen of the foldable display screen 294, and the optical proximity sensor 280G may detect a folding angle or an unfolding angle between the first screen and a second screen according to an optical path difference of an infrared signal.

The gyro sensor 280A (or the acceleration sensor 280B) may send detected motion state information (for example, an angular velocity) to the processor 210. The processor 210 determines whether the mobile phone is currently in a handheld state or a foot stool state based on the motion state information (for example, when the angular velocity is not 0, it indicates that the mobile phone 200 is in the handheld state).

The fingerprint sensor 280H is configured to collect a fingerprint. The mobile phone 200 may implement fingerprint unlock, application lock accessing, fingerprint photographing, fingerprint-based call answering, and the like by using a feature of the collected fingerprint.

The touch sensor 280K is also referred to as a "touch panel". The touch sensor 280K may be disposed on the display screen 294. The touch sensor 280K and the display screen 294 form a touchscreen. The touch sensor 280K is configured to detect a touch operation performed on or near the touch sensor. The touch sensor may transmit the detected touch operation to the application processor, to determine a touch event type. The touch sensor may provide a visual output related to the touch operation by using the display screen 294. In some other embodiments, the touch sensor 280K may alternatively be disposed on a surface of the mobile phone 200, and is located on a position different from that of the display screen 294.

For example, the display screen 294 of the mobile phone 200 displays a home screen. The home screen includes icons of a plurality of applications (for example, a camera application and a WeChat application). A user taps/clicks an icon of the camera application in the home screen by using the touch screen 280K to trigger the processor 210 to start the camera application, so as to open the camera 293. The display screen 294 displays an interface of the camera application, for example, a viewfinder interface.

A wireless communication function of the mobile phone 200 may be implemented by using the antenna 1, the antenna 2, the mobile communication module 251, the wireless communication module 252, the modem processor, the baseband processor, and the like.

The antenna 1 and the antenna 2 are configured to transmit and receive an electromagnetic wave signal. Each antenna of the mobile phone 200 may be configured to cover one or more communication frequency bands. Different antennas may also be multiplexed to improve utilization of the antennas. For example, the antenna 1 may be multiplexed as a diversity antenna of a wireless local area network. In some other embodiments, the antenna may be used in combination with a tuning switch.

The mobile communication module 251 may provide a solution to wireless communication such as 2G/3G/4G/5G applied to the mobile phone 200. The mobile communication module 251 may include at least one filter, a switch, a power amplifier, a low noise amplifier (low noise amplifier, LNA), and the like. The mobile communication module 251 may receive an electromagnetic wave through the antenna 1, perform processing such as filtering and amplification on the received electromagnetic wave, and transmit a processed electromagnetic wave to the modem processor for demodulation. The mobile communication module 251 may further amplify a signal modulated by the modem processor, and convert the signal into an electromagnetic wave for radiation through the antenna 1. In some embodiments, at least some function modules of the mobile communication module 251 may be disposed in the processor 210. In some embodiments, at least some function modules of the mobile communication module 251 and at least some modules of the processor 210 may be disposed in a same component. In this embodiment of this application, the mobile communication module 251 may further be configured to perform information exchange with another terminal device, that is, send an audio output request to the another terminal device, or the mobile communication module 251 may be configured to receive an audio output request and package the received audio output request into a message in a specified format.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the demodulated low-frequency baseband signal to the baseband processor for processing. The low-frequency baseband signal is processed by the baseband processor and then transmitted to an application processor. The application processor outputs a sound signal through an audio device (which is not limited to the speaker 270A, the phone receiver 270B, and the like), or displays an image or a video through the display screen 294. In some embodiments, the modem processor may be an independent device. In some other embodiments, the modem processor may be independent of the processor 210, and the modem processor and the mobile communication module 251 or another function module may be disposed in a same component.

The wireless communication module 252 may provide a solution to wireless communication applied to the mobile phone 200, for example, a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, and an infrared (infrared, IR) technology. The wireless communication module 252 may be one or more components into which at least one communication processing module is integrated. The wireless communication module 252 receives an electromagnetic wave by using the antenna 2, performs frequency modulation and filtering processing on an electromagnetic wave signal, and sends a processed signal to the processor 210. The wireless communication module 252 may alternatively receive a to-be-sent signal from the processor 210, perform frequency modulation and amplification on the to-be-sent signal, and convert the signal into an electromagnetic wave for radiation by using the antenna 2. In this embodiment of this application, the wireless communication module 252 is configured to establish a connection to an audio output device and output a voice signal by using the audio output device. Alternatively, the wireless communication module 252 may be configured to connect to an access point device and send a message corresponding to an audio output request to another terminal device or receive a message corresponding to an audio output request sent by another terminal device. Optionally, the wireless communication module 252 may further be configured to receive voice data from the another terminal device.

The mobile phone 200 may implement an audio function such as music playing or recording by using the audio module 270, the speaker 270A, the phone receiver 270B, the microphone 270C, the earphone jack 270D, the application processor, and the like. The mobile phone 200 may receive an input of a key 290, and generate a key signal input related to user setting and function control of the mobile phone 200. The mobile phone 200 may generate a vibration prompt (for example, an incoming call vibration prompt) by using the motor 291. The indicator 292 in the mobile phone 200 may be an indicator light, may be configured to indicate a charging state and a battery change, and may be further configured to indicate a message, a missed call, a notification, and the like. The SIM card interface 295 in the mobile phone 200 is configured to connect to a SIM card. The SIM card may be inserted into the SIM card interface 295 or plugged from the SIM card interface 295, to come into contact with or be separated from the mobile phone 200.

It should be understood that in an actual application, the mobile phone 200 may include more or fewer components than those shown in FIG. 2. This is not limited in this embodiment of this application. The mobile phone 200 shown in the figure is only an example, and may include more or fewer components than those shown in the figure, or combine two or more components, or have a different component configuration. Various components shown in the figure may be implemented in hardware including one or more signal processing circuits or application-specific integrated circuits, software, or a combination of hardware and software.

Figure 3:
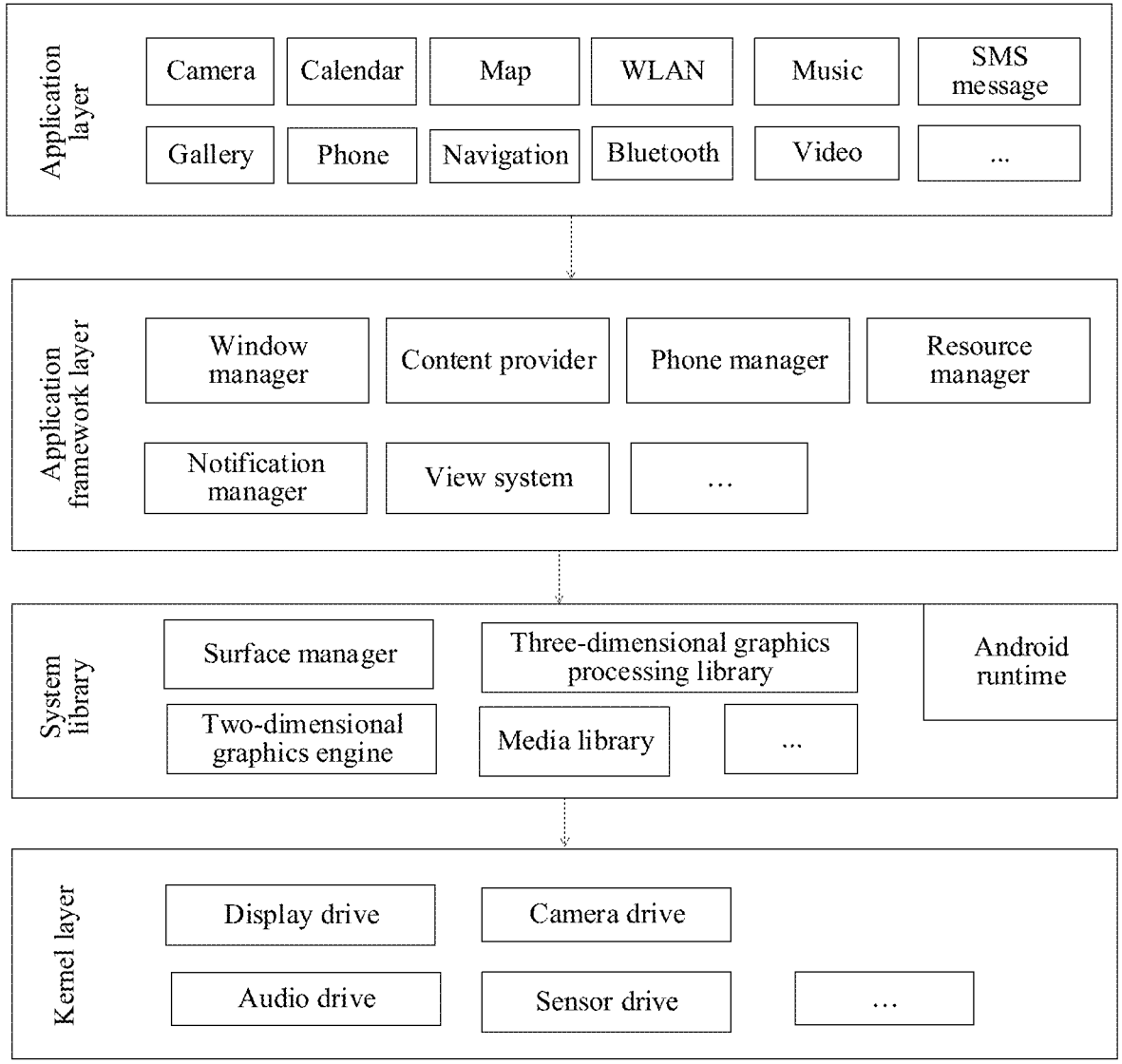
FIG. 3 is a schematic structural diagram of an Android operating system according to an embodiment of this application.

A software system of the terminal device may use a layered architecture, an event-driven architecture, a microkernel architecture, a micro service architecture, or a cloud architecture. In this embodiment of the present disclosure, an Android system with a layered architecture is used as an example to illustrate a software structure of the terminal device. FIG. 3 is a structural block diagram of software of a terminal device according to an embodiment of present disclosure.

In the layered architecture, software is divided into several layers, and each layer has a clear role and task. Layers communicate with each other through a software interface. In some embodiments, the Android system is divided into four layers that are respectively an application layer, an application framework layer, an Android runtime (Android runtime) and system library, and a kernel layer from top to bottom.

The application layer may include a series of application packages.

As shown in FIG. 3, the application packages may include applications such as camera, photos, calendar, phone, maps, navigation, WLAN, Bluetooth, music, videos, and SMS messages.

The application framework layer provides an application programming interface (application programming interface, API) and a programming framework for applications at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window application. The window manager may obtain a size of a display screen, determine whether there is a status bar, lock the screen, capture the screen, and the like.

The content provider is configured to store and obtain data, so that the data can be accessed by an application. The data may include a video, an image, an audio, calls made and answered, a browsing history and bookmarks, an address book, and the like.

The view system includes a visual control such as a control for text display or a control for picture display. The view system may be configured to construct an application. A display interface may be formed by one or more views. For example, a display interface including an SMS notification icon may include a view for displaying text and a view for displaying a picture.

The phone manager is configured to provide a communication function of the terminal device, for example, call state management (including getting through, hang-up, and the like).

The resource manager provides various resources for an application, for example, a localized character string, an icon, a picture, a layout file, and a video file.

The notification manager enables an application to display notification information on a status bar. The notification information may be a message used to indicate a notification type, and may automatically disappear after a short stay without interacting with a user. For example, the notification manager is configured to notify download completion, a message prompt, and the like. The notification manager may alternatively be a notification that appears on a top status bar of the system in a form of a graph or a scroll bar text, for example, a notification of an application running on the background, or may be a notification that appears on the screen in a form of a dialog window. For example, text information is prompted on a status bar, a prompt tone is made, the terminal device vibrates, or an indicator light flash.

The Android Runtime includes a kernel library and a virtual machine. The Android runtime is responsible for scheduling and managing the Android system.

The kernel library includes two parts: One part is a performance function that the Java language needs to invoke, and the other part is a kernel library of Android.

The application layer and the application framework layer run on the virtual machine. The virtual machine executes Java files of the application layer and the application framework layer as binary files. The virtual machine is used to execute functions such as object lifecycle management, stack management, thread management, security and exception management, and garbage collection.

The system library may include a plurality of function modules, for example, a surface manager (surface manager), a media library (media libraries), a three-dimensional graphics processing library (for example, OpenGL ES), and a 2D graphics engine (for example, SGL).

The surface manager is configured to manage a display subsystem, and converge 2D and 3D layers of a plurality of applications.

The media library supports playback and recording of a plurality of common audio and video formats, a static image file, and the like. The media library may support a plurality of audio and video encoding formats, for example, MPEG 4, H.264 MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawings.

The kernel layer is a layer between hardware and software. The kernel layer includes at least a display drive, a camera drive, an audio drive, and a sensor drive.

Figure 4:
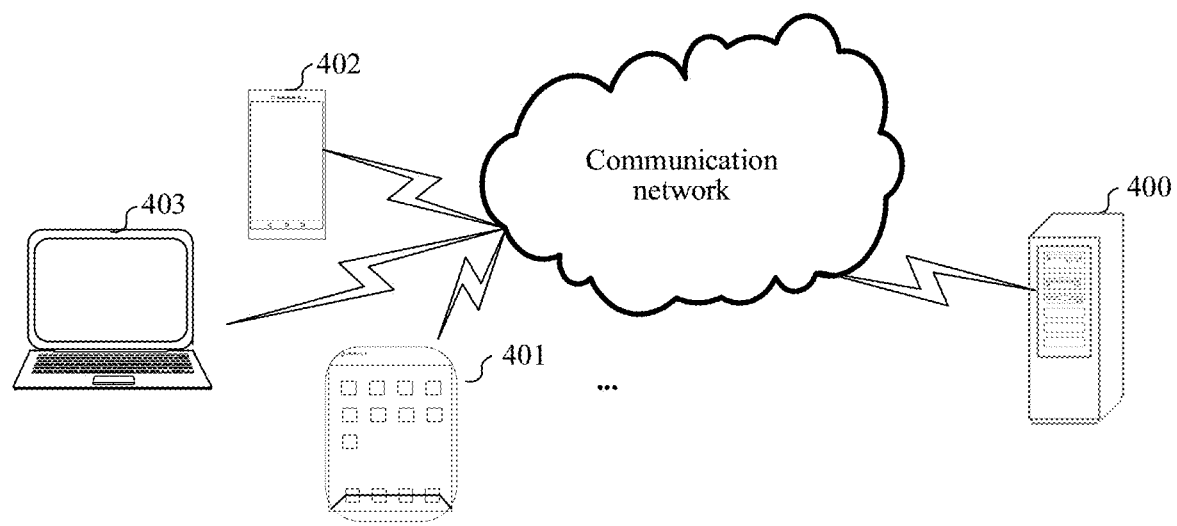
FIG. 4 is a schematic diagram of an application scenario according to an embodiment of this application.

FIG. 4 is a schematic diagram of an application scenario applicable to an embodiment of this application.

As shown in FIG. 4, the application scenario includes: a server 400, a terminal device 401, a terminal device 402, and a terminal device 403.

The server 400 can perform information exchange with the terminal device 401, the terminal device 402, and the terminal device 403. For example, the terminal device 401, the terminal device 402, and the terminal device 403 obtains information about a system authentication account from the server 400, so that the terminal device 401, the terminal device 402, and the terminal device 403 verify whether the devices log in to a same system authentication account. In some scenarios, the server 400 may be connected to the terminal device 201, the terminal device 402, and the terminal device 403 by a network. The server 400 may also be a cloud server, a server cluster, or the like located at a network side.

In FIG. 4, the terminal device 401, the terminal device 402, and the terminal device 403 may be various terminal devices of different types, for example, a mobile phone, a notebook computer, a tablet computer, an intelligent television, and a smart watch.

In FIG. 4, the terminal device 401, the terminal device 402, and the terminal device 403 establish a connection with each other in a wired and/or wireless manner. The terminal device 401, the terminal device 402, and the terminal device 403 may establish a connection with the server 400 in a wired and/or wireless manner. For example, the terminal device 401 may establish a connection with the terminal device 402 by using a data line. In another example, the terminal device 401 may be interconnected to the terminal device 402 by using a wireless communication network. The wireless communication network may be a local area network or may be a wide area network switched through a relay (relay) device. When the communication network is the local area network, for example, the communication network may be a near-field communication network such as a Wi-Fi hotspot network, a Wi-Fi P2P network, a Bluetooth network, a zigbee network, or a near field communication network. When the communication network is the wide area network, for example, the communication network may be a 3rd-generation wireless telephone technology (3rd-generation wireless telephone technology, 3G) network, a 4th-generation mobile communication technology (the 4th generation mobile communication technology, 4G) network, a 5th-generation mobile communication technology (5th-generation mobile communication technology, 5G) network, a future evolved public land mobile network (public land mobile network, PLMN), the Internet, or the like. In the scenario shown in FIG. 4, data may be sent between different terminal devices by using the communication network, for example, pictures text, videos, or retrieval results of the terminal devices for objects such as pictures, text, or videos.

It should be noted that, the system may further include more terminal devices, or the system may include less than three terminal devices. This is not limited in this embodiment of this application.

In this embodiment of this application, after being connected to a same access point device, a terminal device in FIG. 4 further needs to perform authentication on system authentication accounts of other terminal devices in advance. In this way, after the authentication succeeds, the terminal device may receive messages sent by the other terminal devices. Specifically, the terminal device 401 (or referred to as a first terminal device, the terminal device 402 (or referred to as a second terminal device), the terminal device 403 (or referred to as a third terminal device) in FIG. 4 are still used as an example. For ease of uniform description, a description is made below by using the first terminal device, the second terminal device, and the third terminal device. The first terminal device, the second terminal device, and the third terminal device may be all connected to a same access point (AP). For example, the first terminal device, the second terminal device, and the third terminal device are all connected to a same router, or the first terminal device, the second terminal device, and the third terminal device are all connected to a same Wi-Fi hotspot. In the method, a device connected to the access point further includes a fourth terminal device, so that the first terminal device, the second terminal device, the third terminal device, and the fourth terminal device may complete networking, that is, located in a same network.

Figure 5A:
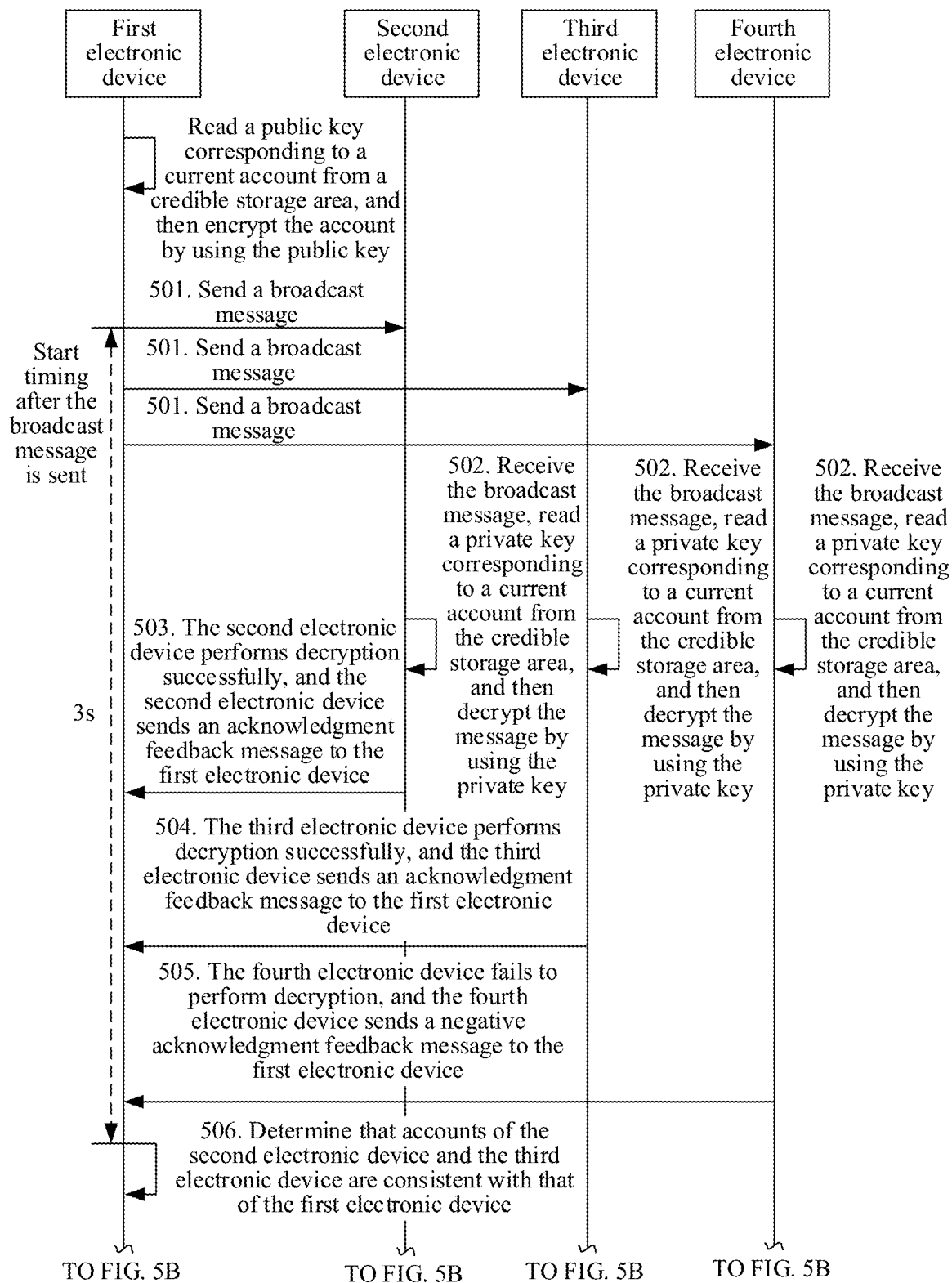
FIG. 5A and FIG. 5B is a schematic diagram of a device account verification manner according to an embodiment of this application.

After a network connection is established between the terminal devices, the first terminal device may first perform authentication on other devices connected to the same access point, that is determine whether the other devices have a same system authentication account as the first terminal device. The first terminal device determines a target device set with a same system authentication accounts, and then the first terminal device and the terminal devices in the target device set complete authentication. Specifically, as shown in FIG. 5A, the authentication method includes the following steps.

Step 501. A first terminal device sends a broadcast message by using a wireless communication module 252, where the broadcast message includes a ciphertext, and the ciphertext is obtained by the first terminal device encrypting a system authentication account of the first terminal device by using a public key corresponding to the system authentication account of the first terminal device.

The first terminal device may obtain a public key corresponding to a system authentication account of the first terminal device from a server in advance. For example, an account of the first terminal device may be a Huawei account. The first terminal device may obtain a public key corresponding to the Huawei account from a Huawei cloud server, encrypt the Huawei account by using the public key, and then generate a broadcast message.

Step 502. After a second terminal device, a third terminal device, and a fourth terminal device receive the broadcast message by using the wireless communication module 252, processors 210 of the second terminal device, the third terminal device, and the fourth terminal device read private keys corresponding to system authentication accounts of the second terminal device, the third terminal device, and the fourth terminal device from a credible storage area of a memory 221, and then the processors 210 of the second terminal device, the third terminal device, and the fourth terminal device decrypt the broadcast message by using the private keys.

The second terminal device, the third terminal device, and the fourth terminal device may obtain private keys corresponding to system authentication accounts of the second terminal device, the third terminal device, and the fourth terminal device from the server in advance. For example, if accounts of the second terminal device, the third terminal device, and the fourth terminal device are all Huawei accounts, the second terminal device, the third terminal device, and the fourth terminal device may obtain private keys corresponding to the Huawei accounts of the second terminal device, the third terminal device, and the fourth terminal device from the Huawei cloud server in advance and store the private keys in the credible storage area.

Step 503. If the second terminal device performs decryption successfully, the second terminal device sends an acknowledgment feedback message to the first terminal device by using the wireless communication module 252, where the acknowledgment feedback message indicates that the second terminal device decrypts the ciphertext successfully.

Step 504. If the third terminal device performs decryption successfully, the third terminal device sends an acknowledgment feedback message to the first terminal device by using the wireless communication module 252, where the acknowledgment feedback message indicates that the third terminal device decrypts the ciphertext successfully.

Step 505. If the fourth terminal device fails to perform decryption, the fourth terminal device sends a negative acknowledgment feedback message to the first terminal device by using the wireless communication module 252, where the negative acknowledgment feedback message indicates that the fourth terminal device fails to decrypt the ciphertext.

Step 506. A processor 210 of the first terminal device may perform a method defined by an account verification module 2211, and the processor 210 determines that the system authentication accounts of the second terminal device and the third terminal device are consistent with that of the first terminal device according to the acknowledgment feedback messages from the second terminal device and the third terminal device, so that a network connection is established among the first terminal device, the second terminal device, and the third terminal device, to complete networking.

In a possible embodiment, when sending a broadcast message, the first terminal device may start a timer. When a timing duration expires, the first terminal device determines an acknowledgment feedback message received within the duration (for example, 3s). It is assumed that the first terminal device receives acknowledgment feedback messages from the second terminal device and the third terminal device within the duration, the first terminal device, the second terminal device, and the third terminal device complete networking.

It can be learned that another terminal device decrypts a broadcast message by using a private key corresponding an account of the another terminal device, and if the decryption succeeds, it indicates that the another device and a terminal device sending the broadcast message log in to a same system authentication account. The method can ensure the security of data access between devices and prevent the data from being illegally accessed.

Figure 5B:
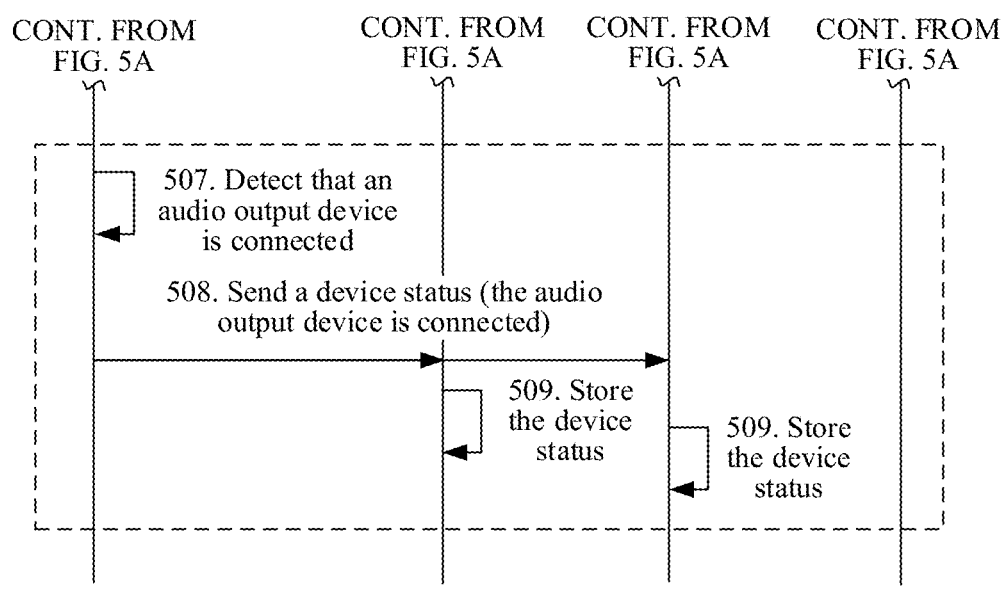

In a possible embodiment of this application, after the first terminal device completes authentication on the second terminal device and the third terminal device, the first terminal device connected to an audio output device may select all or some of the second terminal device and the third terminal device to perform device status synchronization. For the first terminal device to synchronize a device status to the second terminal device and the third terminal device, the method shown in FIG. 5B may further include the following steps.

Step 507. The processor 210 of the first terminal device may perform a method defined by a device synchronization module 2213, the processor 210 detects that an audio output device is connected, and the first terminal device determines a type of the audio output device and an application type corresponding to a voice service currently outputted by the audio output device, and generates a device status related to the audio output device, where the device status may include that the first terminal device is connected to the audio output device, the type (wired or wireless) of the audio output device, and the application type corresponding to the voice service currently outputted by the audio output device.

For example, it is assumed that the first terminal device is a tablet device, the tablet device is currently connected to a Bluetooth earphone, and the tablet device currently outputs an audio signal of a video service from a video application by using the Bluetooth earphone. Therefore, a device status related to the Bluetooth earphone includes that: the tablet device is connected to an earphone, and the earphone is a wireless earphone, and an application type corresponding to a voice service currently outputted by the wireless earphone is a video application.

Step 508. The first terminal device sends the device status to the second terminal device and the third terminal device by using the wireless communication module 252.

According to the above example, it is assumed that the second terminal device is a notebook computer and the third terminal device is a mobile phone, the tablet device may package the device status into signaling, and then send a multicast message including the signaling to the notebook computer and the mobile phone through Wi-Fi. After receiving the multicast message, the notebook computer and the mobile phone may parse the multicast message to obtain the device status.

Step 509. After receiving the device status by using the wireless communication module 252, the second terminal device and the third terminal device store the device status.

Figure 6:
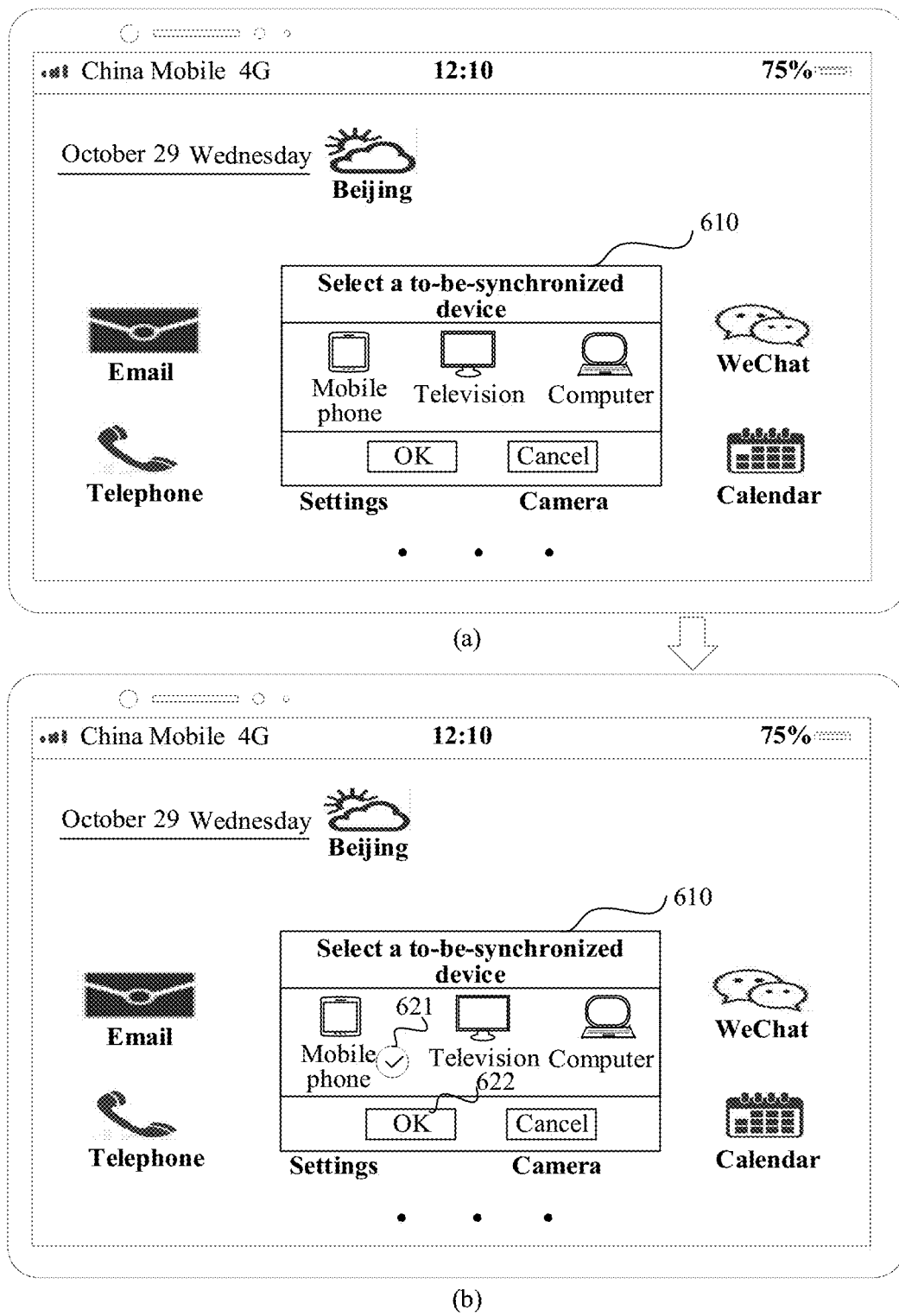
FIG. 6 is a schematic diagram of a group of interfaces according to an embodiment of this application.

For example, it is assumed that the tablet device 101 is currently connected to the Bluetooth earphone, and the tablet device 101 plays voice content in the video application by using the Bluetooth earphone, as shown in FIG. 1. After performing authentication on devices in the local area network according to the above method, the tablet device 101 determines that terminal devices with a same system authentication account also include a mobile phone 102, a PC (notebook computer), and an intelligent television. The tablet device 101 may display a pop-up box 610. As shown in (a) in FIG. 6, the pop-up box 610 displays prompt information, and the prompt information is used for prompting a user to select a device that needs to perform status synchronization. As shown in (b) in FIG. 6, the tablet device 101 receives a selection operation 621 of a user on an icon of the mobile phone 102 and receives an operation of the user on a confirmation control 622, so that the tablet device 101 chooses to send the device status to the mobile phone 102. Therefore, the mobile phone 102 may acquire a current state of the audio output device from the tablet device 101, where the state is that the audio output device is connected to the tablet device 101, the audio output device is a Bluetooth earphone, and the audio output device currently outputs a voice content part of a video service of a video application.

Considering that the audio output device is classified as two types of a wired audio output device and a wireless audio output device, the audio output method provided in this embodiment of this application is illustrated in two scenarios below.

Scenario 1: The Audio Output Device is a Wired Audio Output Device

Figure 7A:
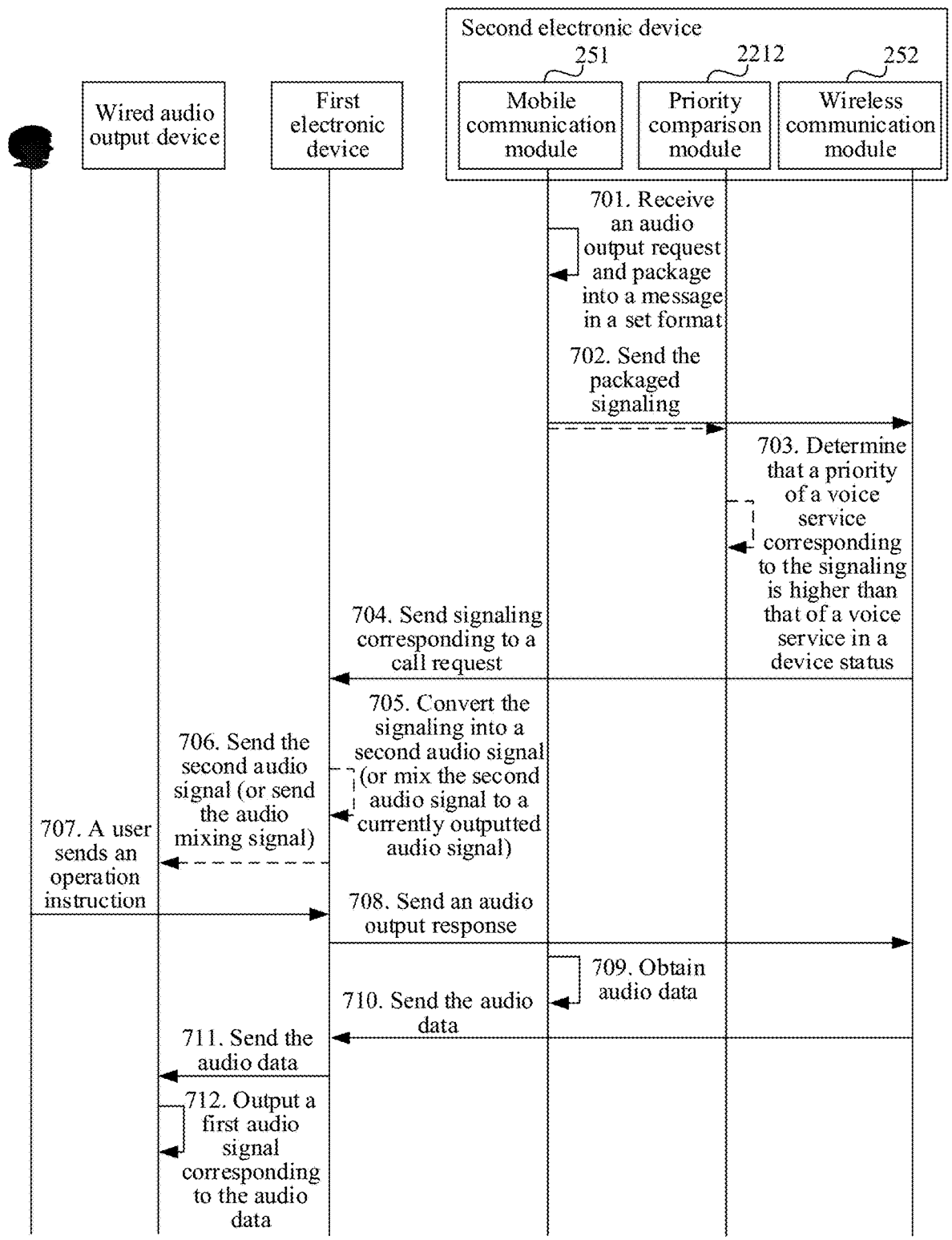
FIG. 7A is a schematic interaction diagram of an audio output method corresponding to a wired audio output device according to an embodiment of this application.

As shown in FIG. 7A, an embodiment of this application provides an audio output method. The method may be implemented by at least two terminal devices of a user, where the at least two terminal devices of the user are connected to a network by using a same system authentication account. For example, a first terminal device and a second terminal device of the user are used as an example, and the first terminal device is currently connected to the wired audio output device. Specifically, the method includes the following steps.

Step 701. A mobile communication module 251 of a second terminal device receives an audio output request.

In a possible implementation, the second terminal device packages the audio output request into signaling in a set format.

The audio output request may be a video service playing request of a video application, or a music playing request of a music application, or a radio playing request of a radio station application, or a call request. The call request may be a voice call request received by the second terminal device or a voice call request or a video call request received by the second terminal device by using a third-party application (for example, WeChat or Facebook).

Figure 7B:
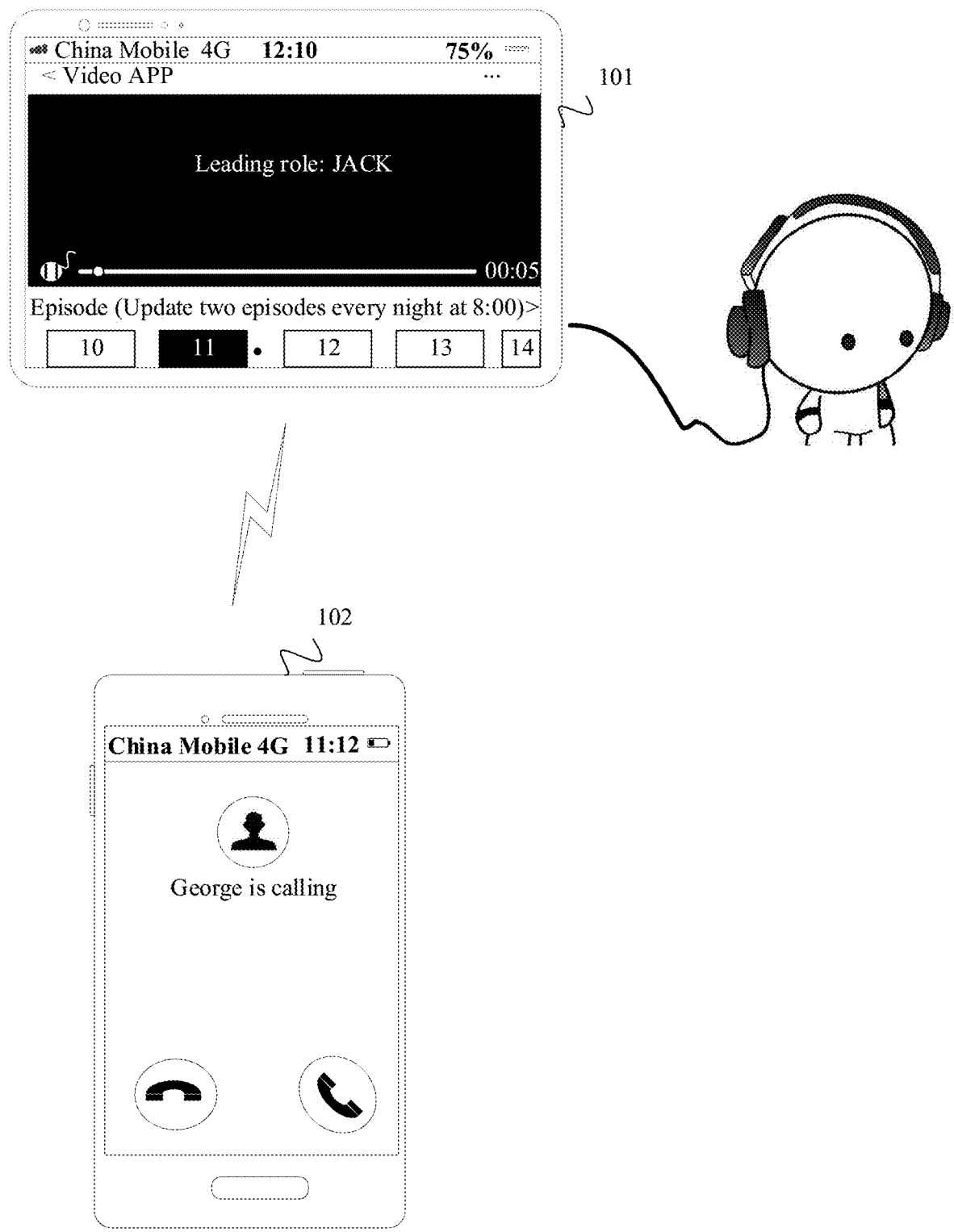
FIG. 7B is a schematic diagram of an application scenario according to an embodiment of this application.

For example, as shown in FIG. 7B, it is assumed that the second terminal device is a mobile phone 102, and the audio output request may be a call request received by the mobile phone 102. For example, the mobile phone 102 in FIG. 7B displays an incoming call request from George.

Step 702. The mobile communication module 251 of the second terminal device sends packaged signaling to a wireless communication module 252.

Optionally, after step 702 or when step 702 is performed, step 703 may further be performed: the mobile communication module 251 of the second terminal device sends the packaged signaling to a priority comparison module 2212, and the priority comparison module 2212 of the second terminal device obtains a device status of a wireless audio output device of a first terminal device from a status synchronization module 2213, and determines that a priority of a voice service corresponding to the message is higher than a priority of a voice service in a stored device status. For example, as shown in FIG. 7B, it is assumed that the second terminal device is the tablet device 101, a device status stored in a status synchronization module 2213 is that the audio output device is a wired earphone and the tablet device 101 currently outputs an audio signal of a video service by using the wired earphone. Therefore, a priority comparison module 2212 determines that a priority of a voice service corresponding to the call request is higher than that of the video service.

It should be noted that, in step 703, the device status stored in the status synchronization module 2213 may either not include a voice service, or may be that the wired audio output device is connected to the first terminal device, and the wired audio output device does not output an audio signal. For example, in FIG. 7B, the wired earphone is inserted into the tablet device 101, but when the tablet device 101 pauses playing a video, the device status does not include a voice service. In this case, the priority comparison module 2212 of the second terminal device may still determine a priority of a voice service corresponding to the message.

Step 704. The wireless communication module 252 of the second terminal device sends the signaling corresponding to the audio output request to the first terminal device.

For example, it is assumed that in FIG. 7B, the tablet device 101 and the mobile phone 102 are connected to a same Wi-Fi hotspot, the mobile phone 102 may send signaling corresponding to the call request to the tablet device by using a WLAN network.

Step 705. A processor 210 of the first terminal device converts the signaling into a second audio signal.

For example, with reference to FIG. 7B, the tablet device 101 may convert the signaling into voice content similar to "George is calling, and do you answer?".

In a possible implementation, step 705 may further be that: after converting the message into the second audio signal, the processor 210 of the first terminal device mixes the second audio signal to a currently outputted third audio signal, where the third audio signal is an audio signal from the first terminal device. With reference to FIG. 7B, the third audio signal may be the voice content of the video service of the video application currently outputted by the tablet device 101. The tablet device 101 mixes the voice content and the second audio signal, for example, the tablet device 101 converts the message into a second audio signal, for example, "George is calling, and do you answer?", and then mixes the second audio signal into an audio signal of the currently output video service.

Step 706. The first terminal device outputs the second audio signal by using a wired audio device.

For example, with reference to FIG. 7B, the tablet device 101 pauses playing the voice content of the video application, and plays the second audio signal, for example, "George is calling, and do you answer?".

In a possible implementation, step 705 may alternatively be that the first terminal device outputs an audio mixing signal including the second audio signal and the third audio signal by using the wired audio device. For example, with reference to FIG. 7B, the tablet device 101 controls a left channel of the wired earphone to play the voice content "George is calling, and do you answer?" in a high volume and a right channel to play the audio signal of the video service in a low volume at the same time.

It should be noted that, step 705 and step 706 may be optional steps. In a possible case, if the first terminal device is a device such as an intelligent television, a user cannot respond to an audio output request (for example, answering a call or hanging up a call) by performing a touch operation on the first terminal device, so that the first terminal device may perform step 705 and step 706, so as to facilitate the user to confirm that a call is answered or a call is hanged up by operating an audio output device. For example, the user answers a call or hangs up a call by operating a key on an earphone, or the user sends a voice instruction to an earphone, to answer a call or hang up a call.

In another possible case, if the first terminal device is a tablet computer, a notebook computer, or the like, the user may answer a call or hang up a call by operating the first terminal device, and step 705 and step 706 may not be performed. Step 705 and step 706 may be replaced with a case that the first terminal device displays prompt information, where the prompt information is used for prompting the user that there is the audio output request from the second terminal device. For example, when the audio output request is a call request of the mobile phone 102, the tablet device 101 may display an interface, where the interface includes prompt information, which is used for prompting a user that there is an incoming call on the mobile phone and do you answer.

Step 707. A user sends an operation instruction to trigger the first terminal device to generate an audio output request response.

In a possible example, a user may trigger the first terminal device connected to the wired audio output device to generate an audio output request response (for example, answering a call or hanging up a call) by operating a physical button on the wired audio device (for example, a wired earphone).

In another possible example, the user may generate an audio output request response by operating the first terminal device. For example, the tablet device may display a prompt box, where the prompt box prompts the user that the mobile phone 102 has an incoming call, and the tablet device 101 may receive a touch operation of the user on the tablet device 101 to generate an audio output request response (for example, answering a call or hanging up a call).

In still another possible example, the user may send a voice instruction to the first terminal device by using the wired audio device, and trigger the first terminal device to generate an audio output request response. For example, a user may send a voice instruction of "answer a call", to trigger the tablet device 101 to generate an audio output request response of answering a call; or the user may send a voice instruction of "hang up", to trigger the tablet device 101 to generate an audio output request response of hanging up a call.

Step 708. The first terminal device sends the audio output request response to the second terminal device.

With reference to FIG. 7B, the tablet device 101 sends a call request response to the mobile phone 102. The call request response may be an acknowledgment response such as answering an incoming call or may be a negative acknowledgment response such as rejecting the incoming call.

Step 709. When the audio output request response is an acknowledgment response, the second terminal device obtains audio data corresponding to the audio output request.

For example, when the acknowledgment response is to confirm that an incoming call is answered, the second terminal device answers the call, and the mobile communication module 251 of the second terminal device receives call data from a network device, thereby obtaining the call data. For example, the mobile phone 102 in FIG. 7B answers a call, and the mobile phone 102 receives call data from a network device.

Step 710. The second terminal device sends the audio data to the first terminal device by using the wireless communication module 252.

For example, the mobile phone 102 in FIG. 7B sends the call data to the tablet device 101.

Step 711. The first terminal device outputs the audio data to a wired audio output device.

Step 712. The wired audio output device outputs a first audio signal corresponding to the audio data.

In a possible implementation, if the first terminal device does not output an audio signal by using the audio output device currently, the first terminal device may directly output a first audio signal corresponding to the audio data by using the wired audio device.

In a possible implementation, if the first terminal device controls the audio output device to output a third audio signal before receiving the audio data, the first terminal device controls the wired audio device to stop outputting the third audio signal, and then outputs the first audio signal corresponding to the audio data by using the wired audio device. For example, it is assumed that in FIG. 7B, before receiving the call data from the mobile phone 102, the tablet device 101 outputs the voice content of the video service by using the wired earphone, so that after receiving the call data, the tablet device 101 controls the wired earphone to stop outputting the voice content of the video service, and controls the wired earphone to start outputting voice content corresponding to the call data.

It should be noted that, in the method, in a possible implementation, after a second terminal device receives an audio output request, a mobile communication module 251 of the second terminal device sends packaged signaling to a wireless communication module 252, and the second terminal device may directly send the packaged signaling corresponding to the call request to a first terminal device by a wireless communication module 252. The first terminal device may determine, by using a priority comparison module 2212 in the first terminal device, that a priority of a voice service corresponding to the audio output request is higher than a priority of a voice service in a device status, and then the first terminal device continues to execute subsequent step 705 to step 711.

In addition, it should be noted that, in this embodiment of this application, priorities of various voice services may be pre-defined in descending order, or a user may customize priorities of various voice services in descending order (for example, the sequence is a voice call initiated by a telephone application (a system application), a voice call or a video call initiated by a third-party application, an audio signal outputted by a video application, and an audio signal outputted by a music application sequentially). A priority module in the first terminal device or the second terminal device may compare priorities of voice services corresponding to different devices according to the priority sequence. If it is determined that a priority of a voice service of the second terminal device is higher than a priority of a voice service stored in a status synchronization module 2213, the audio signal switching process is performed, or otherwise, a voice signal outputted by the audio output device is not switched. For example, the tablet device 101 may output a voice service of a video call of a WeChat application by using a wired earphone. In this case, if a telephone application of the mobile phone 102 displays an incoming call, the mobile phone 102 determines that a priority of a voice service of the mobile phone 102 is higher than a priority of a voice service of the video call stored in the status synchronization module 2213, so that the tablet device 101 controls the wired earphone to output call data from the mobile phone 102. In this embodiment of this application, the types of the audio signals outputted before and after the audio output device is switched in the audio output method are not limited, and a specific type of the audio signal may be based on a specific application scenario. Details are not described herein again.

It can be learned that in this embodiment of this application, the user can switch to output audio signals from different devices on the wired audio output device without requiring to hold the second terminal device nor insert or eject the wired audio output device. For example, when a mobile phone is not around the user, output of call data may be switched on the wired audio output device according to the method, and it is not easy to miss a call, to achieve the better user experience.

Scenario 2: The Audio Output Device is a Wireless Audio Output Device

Figure 8:
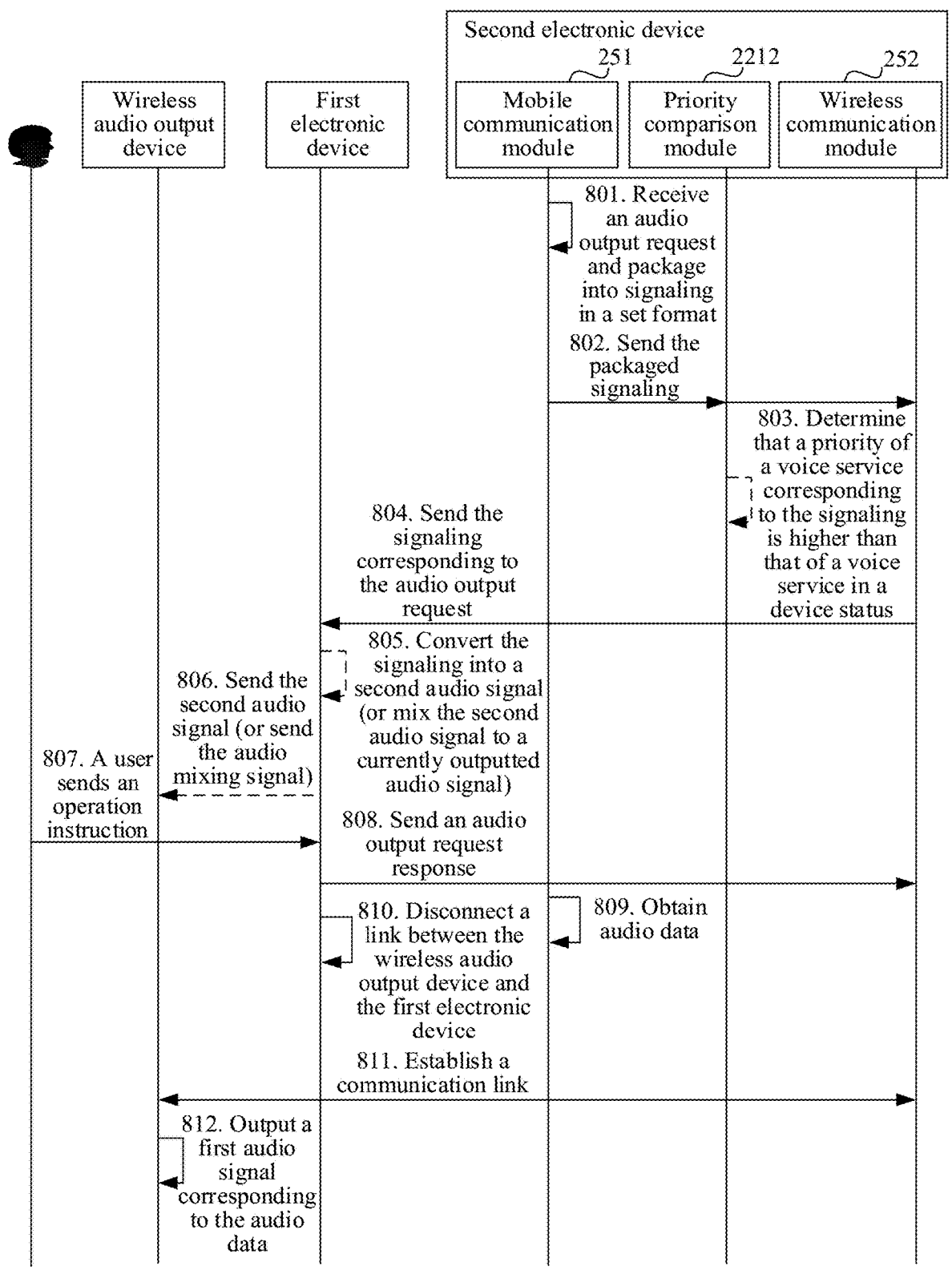
FIG. 8 is a schematic flowchart of another audio output interaction according to an embodiment of this application.

As shown in FIG. 8, an embodiment of this application provides an audio output method. The method may be implemented by at least two terminal devices of a user, where the at least two terminal devices of the user are connected to a network by using a same system authentication account. For example, a first terminal device and a second terminal device of the user are used as an example, and the first terminal device is currently connected to the wireless audio output device. Specifically, the method includes the following steps.

In FIG. 8, step 801 to step 809 are the same as step 701 to step 709, and details are not described herein again.

Step 810. When the audio output request response is an acknowledgment response, the first terminal device disconnects a first communication link between the wireless audio output device and the first terminal device.

For example, in FIG. 1, after receiving an operation instruction of a user, the tablet device 101 determines that an audio output request response is answering an incoming call, and the tablet device 101 disconnects a Bluetooth communication link with a Bluetooth earphone.

Step 811. When the audio output request response is the acknowledgment response, a second communication link is established between the second terminal device and the audio output device, and the second terminal device outputs the audio data to the audio output device.

For example, in FIG. 1, after receiving an operation instruction of a user, the mobile phone 102 determines that the audio output request response is answering an incoming call, and establishes a Bluetooth communication link with the Bluetooth earphone. For example, the mobile phone 102 quickly establishes a Bluetooth communication link with the Bluetooth earphone by using a google fast pair service (google fast pair service, GFPS).

Step 812. The wireless audio output device outputs a first audio signal corresponding to the audio data.

For example, in FIG. 1, after receiving call data, the mobile phone 102 controls the Bluetooth earphone to start outputting voice content corresponding to the call data.

It should be noted that, in the scenario 2, in a possible implementation, after a second terminal device receives an audio output request, a mobile communication module 251 of the second terminal device sends packaged signaling to a wireless communication module 252, and the second terminal device may directly send the packaged message corresponding to the audio output request to a first terminal device by using the wireless communication module 252. The first terminal device may determine that a priority of a voice service corresponding to the call request is higher than a priority of a voice service in a device status by using a priority comparison module 2212 in the first terminal device, and then the first terminal device continues to execute subsequent step 805 to step 813.

In addition, it should be noted that, in this embodiment of this application, priorities of various voice services may be pre-defined in descending order, or a user may customize priorities of various voice services in descending order (for example, the sequence is a voice call initiated by a telephone application (a system application), a voice call or a video call initiated by a third-party application, an audio signal outputted by a video application, and an audio signal outputted by a music application sequentially). A priority module in the first terminal device or the second terminal device may compare priorities of voice services corresponding to different devices according to the priority sequence. If it is determined that a priority of a voice service of the second terminal device is higher than a priority of a voice service stored in a status synchronization module 2213, the audio signal switching process is performed, or otherwise, a voice signal outputted by the audio output device is not switched. For example, the tablet device 101 may output a voice service of a video call of a WeChat application by using a Bluetooth earphone. In this case, if a telephone application of the mobile phone 102 displays an incoming call, the mobile phone 102 determines that a priority of a voice service of the mobile phone 102 is higher than a priority of a voice service of the video call stored in a status synchronization module 2213, so that the tablet device 101 is disconnected from the Bluetooth earphone, and the Bluetooth earphone establishes a connection with the mobile phone 102 and output call data from the mobile phone 102. In this embodiment of this application, the types of the audio signals outputted before and after the audio output device is switched in the audio output method are not limited, and a specific type of the audio signal may be based on a specific application scenario. Details are not described herein again.

It can be learned that in this embodiment of this application, the user can switch to output audio signals from different devices on the wireless audio output device without requiring to operate the second terminal device nor manually disconnect and reconnect the wireless audio output device. For example, when a mobile phone is not around the user, output of call data may be switched on the wireless audio output device according to the method, and it is not easy to miss a call, to achieve the better user experience.

Figure 9:
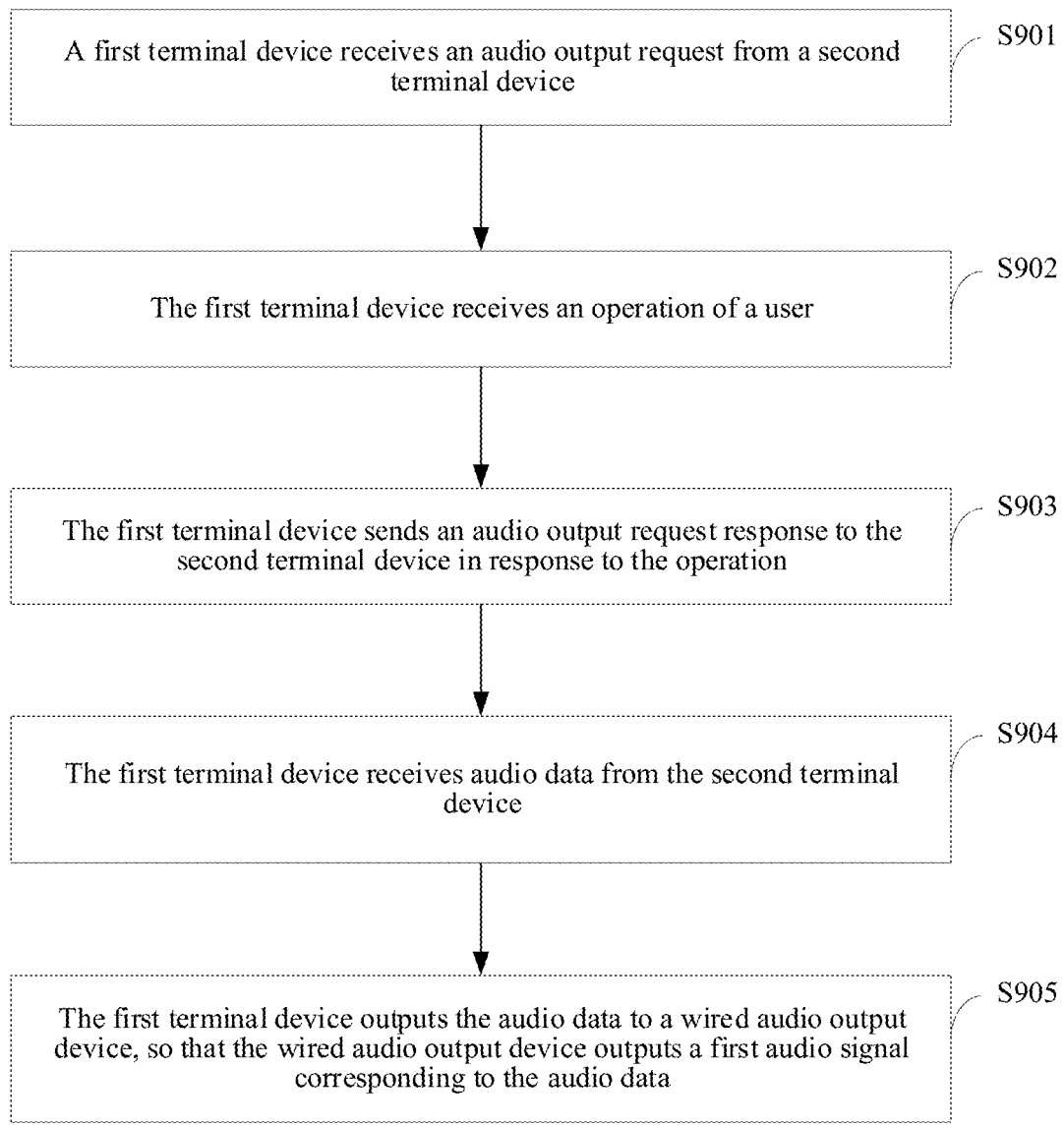
FIG. 9 is a schematic flowchart of another audio output interaction according to an embodiment of this application.
Figure 10:
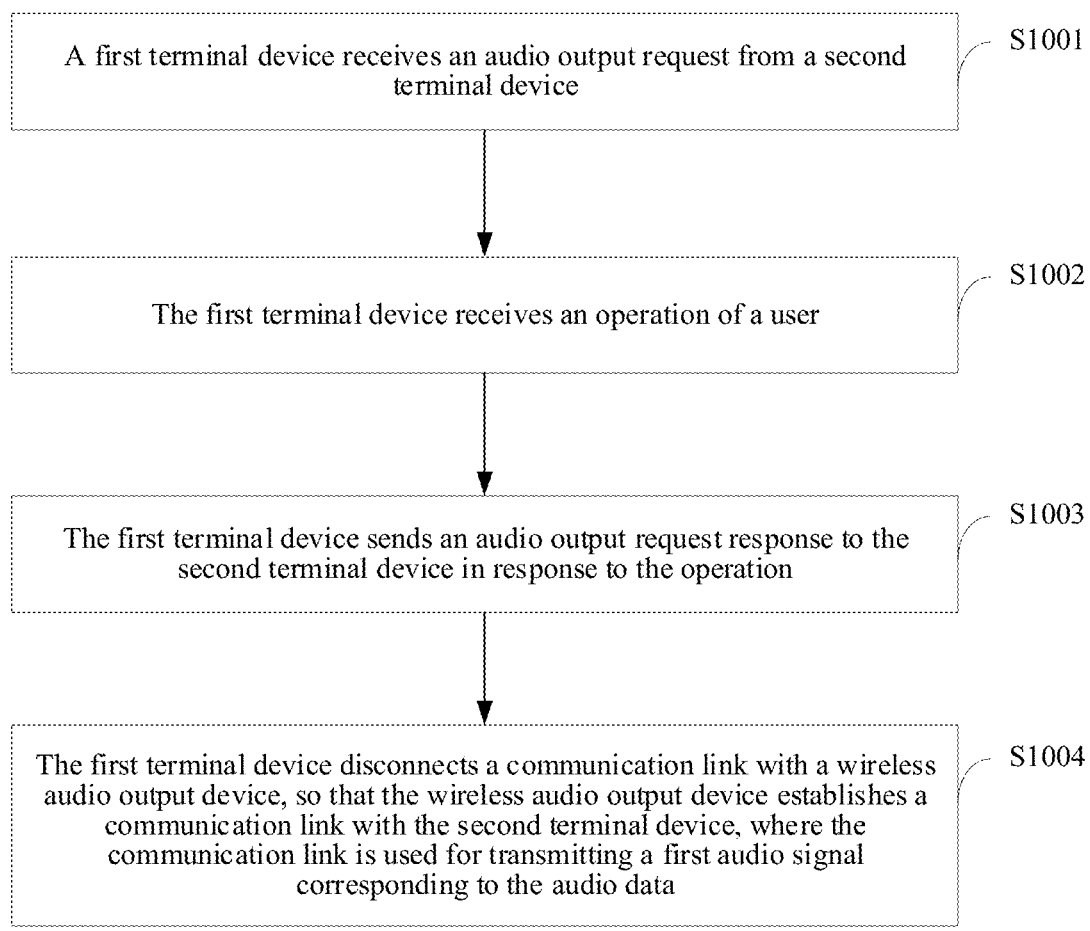
FIG. 10 is a schematic flowchart of another audio output interaction according to an embodiment of this application.
Figure 11:
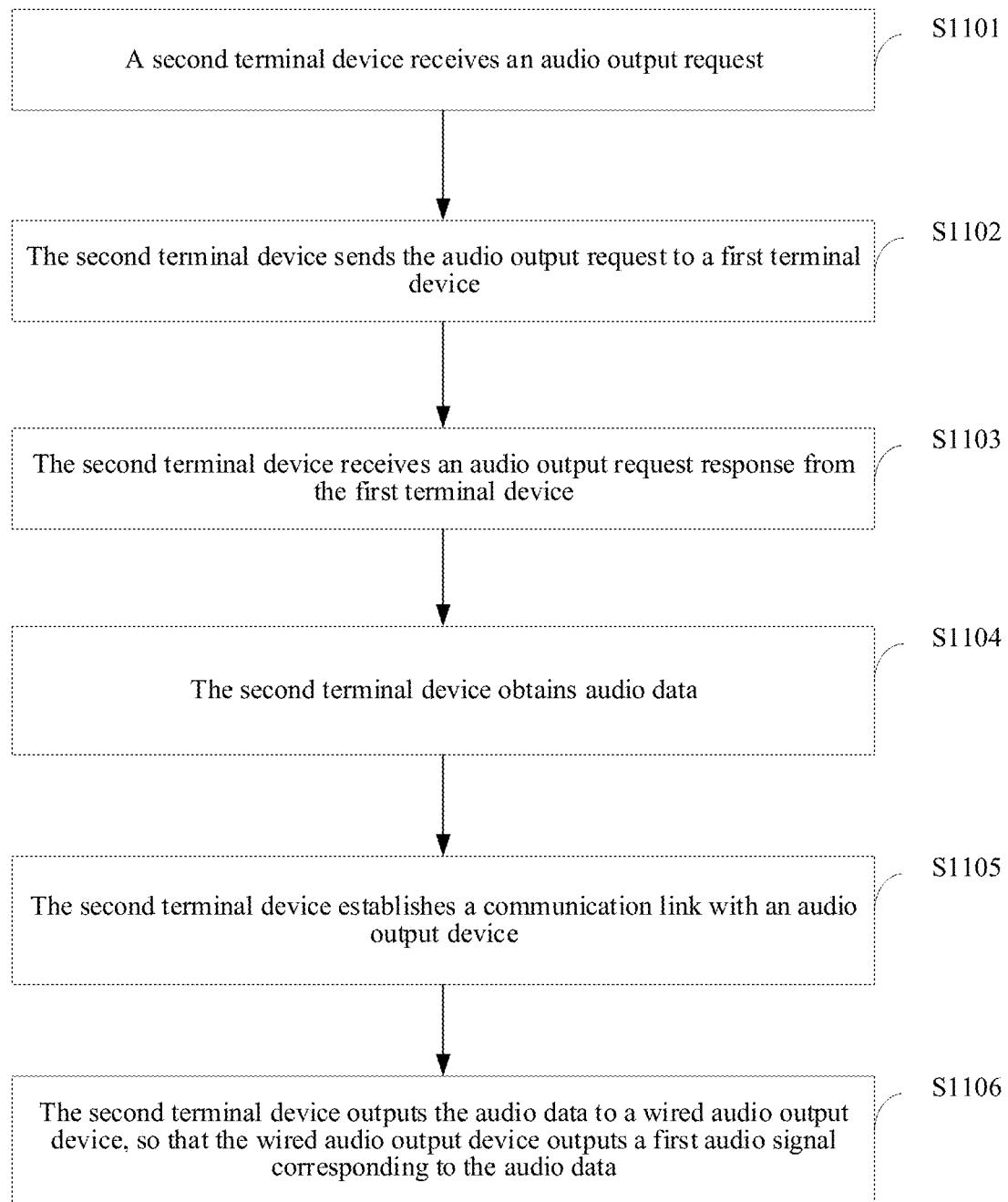
FIG. 11 is a schematic flowchart of another audio output interaction according to an embodiment of this application.

Based on the scenario 1, an embodiment of this application further provides an audio output method. The method may be performed by a first terminal device, as shown in FIG. 9. The method specifically includes the following steps.

Step 901. A first terminal device receives an audio output request from a second terminal device.

The second terminal device and the first terminal device are connected to a network by using a same system authentication account and the first terminal device is currently connected to a wired audio output device. For possible content of the audio output request, reference may be made to step 701. Details are not described herein again.

Step 902. The first terminal device receives an operation of a user.

It should be noted that, optionally, in a possible implementation, before the first terminal device receives an operation of a user, the first terminal device may display prompt information, where the prompt information is used for prompting the user that there is the audio output request from the second terminal device. For a specific example, reference may be made to step 706. In another possible implementation, before the first terminal device receives the operation of the user, the first terminal device may convert the audio output request into a second audio signal and output the second audio signal by using the wired audio output device when the wired audio output device outputs a third audio signal of the first terminal device. For a specific example, reference may be made to step 705, and details are not described herein again.

Step 903. The first terminal device sends an audio output request response to the second terminal device in response to the operation.

The audio output request response is used for triggering the second terminal device to obtain audio data corresponding to the audio output request. For a detailed description, reference may be made to step 707 and step 708. Details are not described herein again.

Step 904. The first terminal device receives audio data from the second terminal device.

That is, when the audio output request response is an acknowledgment response, the second terminal device obtains audio data corresponding to the audio output request and then sends the audio data to the first terminal device. For example, when the acknowledgment response is to confirm that an incoming call is answered, the second terminal device answers the call, and the mobile communication module 251 of the second terminal device receives call data from a network device, thereby obtaining the call data. In another example, when the acknowledgment response is to confirm that a music is played, the second terminal device obtains audio data corresponding to a music file.

Step 905. The first terminal device outputs the audio data to a wired audio output device, so that the wired audio output device outputs a first audio signal corresponding to the audio data.

That is, the first terminal device outputs an audio signal from another terminal device by using a wired audio output device. When the wired audio output device switches the audio signal, the user can switch to output audio signals from different devices on the wired audio output device without requiring to hold the second terminal device nor insert or eject the wired audio output device. For example, when a mobile phone is not around the user, output of call data may be switched on the wired audio output device according to the method, and it is not easy to miss a call, to achieve the better user experience.

Based on the scenario 2, an embodiment of this application further provides an audio output method. The method may be performed by a first terminal device, referring to FIG. 10. The method specifically includes the following steps.

Step 1001. A first terminal device receives an audio output request from a second terminal device.

The second terminal device and the first terminal device are connected to a network by using a same system authentication account and the first terminal device is currently connected to an audio output device. For possible content of the audio output request, reference may be made to step 701. Details are not described herein again.

Step 1002. The first terminal device receives an operation of a user.

It should be noted that, optionally, in a possible implementation, before the first terminal device receives an operation of a user, the first terminal device may display prompt information, where the prompt information is used for prompting the user that there is the audio output request from the second terminal device. For a specific example, reference may be made to step 706. In another possible implementation, before the first terminal device receives the operation of the user, the first terminal device may convert the audio output request into a second audio signal and output the second audio signal by using the wireless audio output device when the wireless audio output device outputs a third audio signal of the first terminal device. For a specific example, reference may be made to step 705, and details are not described herein again.

Step 1003. The first terminal device sends an audio output request response to the second terminal device in response to the operation.

The audio output request response is used for triggering the second terminal device to obtain audio data corresponding to the audio output request. For a detailed description, reference may be made to step 707 and step 708. Details are not described herein again.

Step 1004. The first terminal device disconnects a first communication link with a wireless audio output device, so that the wireless audio output device establishes a second communication link with the second terminal device, where the second communication link is used for transmitting a first audio signal corresponding to the audio data.

That is, when the audio output request response is an acknowledgment response, the first terminal device disconnects a first communication link between the wireless audio output device and the first terminal device. In this way, the second terminal device may establish a second communication link with the wireless audio output device, so that the second terminal device outputs an audio signal corresponding to the audio data by using the wireless audio device. For a specific example, reference may be made to step 811 and step 812. Details are not described herein again.

It can be learned that in this embodiment of this application, the user can switch to output audio signals from different devices on the wireless audio output device without requiring to operate the second terminal device nor manually disconnect and reconnect the wireless audio output device. For example, when a mobile phone is not around the user, output of call data may be switched on the wireless audio output device according to the method, and it is not easy to miss a call, to achieve the better user experience.

Based on the scenario 2, an embodiment of this application further provides an audio output method. The method may be performed by a second terminal device, referring to FIG. 11. The method specifically includes the following steps.

Step 1101. A second terminal device receives an audio output request.

For possible content of the audio output request, reference may be made to step 701. Details are not described herein again.

Step 1102. The second terminal device sends the audio output request to a first terminal device.

The second terminal device and the first terminal device are connected to a network by using a same system authentication account and the first terminal device is currently connected to a wireless audio output device.

Step 1103. The second terminal device receives an audio output request response from the first terminal device.

The audio output request response is used for triggering the second terminal device to obtain audio data corresponding to the audio output request. For a detailed description, reference may be made to step 707 and step 708. Details are not described herein again.

Step 1104. The second terminal device obtains audio data.

For example, when the acknowledgment response is to confirm that an incoming call is answered, the second terminal device answers the call, and the mobile communication module 251 of the second terminal device receives call data from a network device, thereby obtaining the call data. For example, the mobile phone 102 in FIG. 7B answers a call, and the mobile phone 102 receives call data from a network device. In another example, when the acknowledgment response is to confirm that a music is played, the second terminal device obtains audio data corresponding to a music file.

Step 1105. The second terminal device establishes a first communication link with an audio output device.

For a detailed description, reference may be made to step 811. Details are not described herein again.

Step 1106. The second terminal device outputs the audio data to a wired audio output device, so that the wired audio output device outputs a first audio signal corresponding to the audio data.

For example, in FIG. 1, after the mobile phone 102 receives call data, the mobile phone 102 starts outputting voice content corresponding to the call data by using a Bluetooth earphone.

It can be learned that in this embodiment of this application, the user can switch to output audio signals from different devices on the wireless audio output device without requiring to operate the second terminal device nor manually disconnect and reconnect the wireless audio output device. For example, when a mobile phone is not around the user, output of call data may be switched on the wireless audio output device according to the method, and it is not easy to miss a call, to achieve the better user experience.

An embodiment of this application further provides a computer-readable storage medium. The computer-readable storage medium stores computer instructions, and the computer instructions, when running on a terminal device, cause the terminal device to perform the related method steps, to implement the method in the foregoing embodiments.

An embodiment of this application further provides a computer program product. When the computer program product runs on a computer, a computer is enabled to perform the related steps, to implement the method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to cause the chip to perform the method in the foregoing method embodiments.

The terminal device, the computer storage medium, the computer program product, or the chip provided in the embodiments of this application may be configured to perform the corresponding method provided above. Therefore, for beneficial effects that can be achieved, refer to the beneficial effects of the corresponding method provided above. Details are not described herein again.

Based on the foregoing descriptions of the implementations, a person skilled in the art may clearly understand that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in multiple different places. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

If the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A system, comprising:
   a first electronic device connected to a network using a system authentication account, wherein a first music application and a first video call application are installed on the first electronic device;
   a second electronic device connected to the network using the system authentication account, wherein a voice call application, a second music application, and a second video call application are installed on the second electronic device; and
   an audio output device,
   wherein when the audio output device outputs an audio signal corresponding to audio data of the first music application, in response to the second electronic device receiving a first incoming call from the voice call application, the first electronic device is configured to display a first prompt corresponding to the first incoming call,
   wherein in response to a first touch operation received by the first electronic device, the first electronic device is configured to send an indication of answering the first incoming call to the second electronic device,
   wherein whenever the second electronic device receives the indication of answering the first incoming call, the second electronic device is configured to answer the first incoming call through the voice call application, and to send audio data of the first incoming call to the first electronic device,
   wherein the first electronic device is configured to cause the audio output device to output an audio signal corresponding to the audio data of the first incoming call,
   wherein in a first scenario when both a) the first electronic device is connected to the audio output device, and b) the audio output device does not output an audio signal corresponding to audio data from the first electronic device, in response to the second electronic device receiving a first user operation for the second music application, the second electronic device is configured to cause the audio output device to output an audio signal corresponding to audio data of the second music application, and wherein the first user operation is received when the audio output device does not output an audio signal corresponding to audio data from the first electronic device,
   wherein when c) the audio output device outputs an audio signal corresponding to audio data of the first music application, and d) the second electronic device receives a first video call from the second video call application, in response to a second user operation, the second electronic device is configured to answer the first video call through the second video call application, and to cause the audio output device to output an audio signal corresponding to audio data of the first video call, and
   wherein when e) the first electronic device is in a second video call through the first video call application, f) the audio output device outputs an audio signal corresponding to audio data of the first video call application, and g) the second electronic device receives a second incoming call from the voice call application, in response to a third user operation, the second electronic device is configured to answer the second incoming call through the voice call application, and to cause the audio output device to output an audio signal corresponding to audio data of the second incoming call.

2. The system of claim 1, wherein when the audio output device outputs an audio signal corresponding to the audio data of the first music application, in response to the second electronic device receiving the first incoming call from the voice call application, the second electronic device is configured to display a second prompt corresponding to the first incoming call, and
   wherein in response to a fifth user operation received by the second electronic device, the second electronic device is configured to:
   answer the first incoming call through the voice call application;
   establish a communication link with the audio output device; and
   output an audio signal corresponding to audio data of the first incoming call to the audio output device through the communication link.

3. The system of claim 2, wherein when the system authentication account of the second electronic device is consistent with the system authentication account of the first electronic device, the second electronic device is configured to display a second prompt corresponding to the first incoming call, and the first electronic device is configured to display a first prompt corresponding to the first incoming call.

4. The system of claim 3, wherein when the audio output device outputs an audio signal corresponding to the audio data of the first music application, in response to the second electronic device receiving the first incoming call from the voice call application, the audio output device is configured to output a first voice prompt corresponding to the first incoming call.

5. The system of claim 4, wherein in response to a first voice command from a user or a user operation of the audio output device, the second electronic device is configured to answer the first incoming call through the voice call application, and to send audio data of the first incoming call to the first electronic device, and
   wherein the first electronic device is configured to cause the audio output device to output the audio signal corresponding to the audio data of the first incoming call.

6. The system of claim 1, wherein when h) the first electronic device is in a third video call through the first video call application, and i) the audio output device outputs an audio signal corresponding to audio data of the first video call application, the second electronic device receives a tenth user operation to trigger the second electronic device to play the audio data of the second music application, and
   wherein after the second electronic device receives the tenth user operation, the audio output device is configured to continue to output the audio signal corresponding to the audio data of the first video call application.

7. The system of claim 1, wherein when j) the second electronic device is in a call through the voice call application, and k) the audio output device outputs an audio signal corresponding to the audio data of the voice call application, the first electronic device receives a fourth video call of the first video call application, and
   wherein when the first electronic device receives an eleventh user operation, the first electronic device is configured to answer the fourth video call through the first video call application, and the audio output device is configured to continue to output the audio signal corresponding to the audio data of the voice call application.

8. The system of claim 1, wherein when the audio output device outputs an audio signal corresponding to the audio data of the first music application, in response to the second electronic device receiving a fifth video call from the second video call application, the second electronic device is configured to display a third prompt corresponding to the fifth video call, and
   wherein in response to a twelfth user operation received by the second electronic device, the second electronic device is configured to answer the fifth video call through the second video call application, and to cause the audio output device to output an audio signal corresponding to audio data of the fifth video call.

9. The system of claim 1, wherein the first electronic device is a tablet computer, the second electronic device is a mobile phone, and the audio output device is a wireless headset.

10. A first electronic device, comprising:
    one or more processors; and
    a memory coupled to the one or more processors and configured to store instructions that, when executed by the one or more processors, cause the first electronic device to be configured to connect to a network using a system authentication account, wherein a second electronic device is also connected to the network using the system authentication account,
    wherein a voice call application, a second music application, and a second video call application are installed on the second electronic device, and a first music application and a first video call application are installed on the first electronic device, and the instructions, when executed by the one or more processors, further cause the first electronic device to be configured to:
    display a first prompt corresponding to a first incoming call, in response to the second electronic device receiving the first incoming call from the voice call application when the first electronic device is outputting an audio signal corresponding to audio data of the first music application through an audio output device;
    send, in response to receiving a first touch operation, an indication of answering the first incoming call to the second electronic device, wherein whenever the second electronic device receives the indication of answering the first incoming call, the second electronic device is caused to answer the first incoming call through the voice call application and to send audio data of the first incoming call to the first electronic device; and
    receive the audio data of the first incoming call and cause the audio output device to output an audio signal corresponding to the audio data of the first incoming call,
    wherein in a first scenario when both a) the first electronic device is connected to the audio output device, and b) the audio output device does not output an audio signal corresponding to audio data from the first electronic device, in response to the second electronic device receiving a first user operation for the second music application, the second electronic device is configured to cause the audio output device to output an audio signal corresponding to audio data of the second music application, and wherein the first user operation is received when the audio output device does not output an audio signal corresponding to audio data from the first electronic device,
    wherein when c) the audio output device outputs an audio signal corresponding to audio data of the first music application, and d) the second electronic device receives a first video call from the second video call application, in response to a second user operation, the second electronic device is configured to answer the first video call through the second video call application, and to cause the audio output device to output an audio signal corresponding to audio data of the first video call, and
    wherein when e) the first electronic device is in a second video call through the first video call application, f) the audio output device outputs an audio signal corresponding to audio data of the first video call application, and g) the second electronic device receives a second incoming call from the voice call application, in response to a third user operation, the second electronic device is configured to answer the second incoming call through the voice call application, and to cause the audio output device to output an audio signal corresponding to audio data of the second incoming call.

11. The first electronic device of claim 10, wherein the first electronic device is configured to disconnect a first communication link between the first electronic device and the audio output device in response to a fifth user operation received by the second electronic device, wherein the fifth user operation is received in response to a second prompt corresponding to the first incoming call displayed by the second device, wherein the second prompt is displayed in response to the second electronic device receiving the first incoming call from the voice call application.

12. A second electronic device, comprising:
one or more processors; and
a memory coupled to the one or more processors and configured to store instructions that, when executed by the one or more processors, cause the second electronic device to be configured to connect to a network using a system authentication account, wherein a first electronic device is also connected to the network using the system authentication account,
wherein a voice call application, a second music application, and a second video call application are installed on the second electronic device, and a first music application and a first video call application are installed on the first electronic device, and the instructions, when executed by the one or more processors, further cause the second electronic device to be configured to:
receive a first incoming call from the voice call application when an audio output device outputs an audio signal corresponding to audio data of the first music application, wherein a first prompt corresponding to the first incoming call is displayed at the first electronic device in response to the first incoming call;
receive an indication of answering the first incoming call in response to a first touch operation at the first electronic device; and
answer the first incoming call through the voice call application and send audio data of the first incoming call to the first electronic device whenever the second electronic device receives the indication of answering the first incoming call,
wherein the first electronic device is configured to cause the audio output device to output an audio signal corresponding to the audio data of the first incoming call, and
wherein the second electronic device is further configured to:
cause the audio output device to output an audio signal corresponding to audio data of the second music application, in response to receiving a first user operation for the second music application when in a first scenario both a) the first electronic device is connected to the audio output device, and b) the audio output device does not output an audio signal corresponding to audio data from the first electronic device, wherein the first user operation is received when the audio output device does not output an audio signal corresponding to audio data from the first electronic device;
receive a first video call from the second video call application when the audio output device outputs an audio signal corresponding to audio data of the first music application;
answer, in response to a second user operation, the first video call through the second video call application, and cause the audio output device to output an audio signal corresponding to audio data of the first video call;
receive a second incoming call from the voice call application when the first electronic device is in a second video call through the first video call application, and the audio output device outputs an audio signal corresponding to audio data of the first video call application; and
answer, in response to a third user operation, the second incoming call through the voice call application, and cause the audio output device to output an audio signal corresponding to audio data of the second incoming call.

13. The second electronic device of claim 12, wherein when the audio output device outputs an audio signal corresponding to the audio data of the first music application, in response to the second electronic device receiving the first incoming call from the voice call application, the second electronic device is configured to display a second prompt corresponding to the first incoming call, and
wherein in response to receiving a fourth user operation, the second electronic device is configured to:
answer the first incoming call through the voice call application;
establish a communication link with the audio output device; and
output an audio signal corresponding to audio data of the first incoming call to the audio output device through the communication link.

14. The second electronic device of claim 12, wherein the second electronic device is further configured to:
answer the first incoming call through the voice call application, in response to a first voice command from a user or a user operation on the audio output device; and
send audio data of the first incoming call to the first electronic device,
wherein the first electronic device is configured to cause the audio output device to output the audio signal corresponding to the audio data of the first incoming call.

15. The second electronic device of claim 12, wherein the second electronic device is further configured to receive a fifth user operation to trigger the second electronic device to play the audio data of the second music application when the first electronic device is in a third video call through the first video call application, wherein the audio output device outputs an audio signal corresponding to audio data of the first video call application, and wherein after the second electronic device receives the fifth user operation, the audio output device is configured to continue to output the audio signal corresponding to the audio data of the first video call application.

16. The second electronic device of claim 12, wherein when the first electronic device receives an seventh user operation to answer a fourth video call through the first video call application, the second electronic device is further configured to continue to output the audio signal corresponding to the audio data of the voice call application through the audio output device, wherein the fourth video call is received by the first electronic device when the second electronic device is in a call through the voice call application, and the audio output device outputs an audio signal corresponding to the audio data of the voice call application.

17. The second electronic device of claim 12, wherein the second electronic device is further configured to:
display a third prompt corresponding to a fifth video call, in response to the second electronic device receiving the fifth video call from the second video call application when the audio output device outputs an audio signal corresponding to the audio data of the first music application; and
answer the fifth video call through the second video call application, in response to an eighth user operation, and to cause the audio output device to output an audio signal corresponding to audio data of the fifth video call.

18. The second electronic device of claim 12, wherein the second electronic device is a mobile phone.

19. The first electronic device of claim 10, wherein the first electronic device is a tablet computer.

20. The first electronic device of claim 10, wherein the first electronic device is configured to display the first prompt corresponding to the first incoming call when the system authentication account of the first electronic device is consistent with the system authentication account of the second electronic device.

\* \* \* \* \*